United States Patent
Qu et al.

(10) Patent No.: US 12,132,305 B1
(45) Date of Patent: Oct. 29, 2024

(54) GROUNDING SYSTEM AND CONTROL METHOD, INTEGRATED CIRCUITS AND INTEGRATED CIRCUIT PACKAGE THEREOF

(71) Applicant: Halo Microelectronics Co., Ltd, Foshan (CN)

(72) Inventors: Wenchao Qu, Chengdu (CN); Muhammad Ahmed, Garland, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 0 days.

(21) Appl. No.: 18/784,708

(22) Filed: Jul. 25, 2024

(30) Foreign Application Priority Data

Apr. 19, 2024 (CN) .......................... 202410471764.2

(51) Int. Cl.
*H02H 3/18* (2006.01)

(52) U.S. Cl.
CPC .................................... *H02H 3/18* (2013.01)

(58) Field of Classification Search
CPC ...... B60L 3/0069; B60L 3/0092; B60R 16/03; G01R 19/0092; G01R 31/40; G01R 31/67; H02H 11/00; H02H 11/002; H02H 11/003; H02H 3/18; H02H 7/0811; H02H 7/1213; H02H 7/18; H02J 7/0031; H02J 7/0034; H02J 7/0063; H02M 3/33507; H02M 3/33592
See application file for complete search history.

(56) References Cited

U.S. PATENT DOCUMENTS 9,472,948 B2 * 10/2016 Petruzzi .............. H01L 27/0248
11,128,117 B2 * 9/2021 Takahashi ........... H01L 27/0255
(Continued)

FOREIGN PATENT DOCUMENTS

| CN | 107845998 A | 3/2018 |
| CN | 109193079 A | 1/2019 |

(Continued)

OTHER PUBLICATIONS

Hui, Gao, et al., "A Design of External Enabling Power Supply with Reverse Connection Protection", Electronics World, Issue 1, Jan. 31, 2022.

*Primary Examiner* — Jared Fureman
*Assistant Examiner* — Nicolas Bellido
(74) *Attorney, Agent, or Firm* — AP3 Law Firm PLLC

(57) ABSTRACT

A grounding system includes a first circuit portion and a second circuit portion. The first circuit portion is connected to an input voltage bus and has a terminal being a first ground. The second circuit portion is connected between the first ground and a second ground, and includes a switch branch and a resistor branch. When the positive terminal of a power supply is connected to the input voltage bus and the negative terminal of the power supply is connected to the second ground, the switch branch establishes a first current path between the first ground and the second ground and shorts a first diode in the switch branch. When the positive terminal is connected to the second ground and the negative terminal is connected to the input voltage bus, the switch branch disconnects the first current path and stops shorting the first diode.

23 Claims, 17 Drawing Sheets

(56) References Cited

U.S. PATENT DOCUMENTS

| | | | |
|---|---|---|---|
| 2015/0092307 A1* | 4/2015 | Petruzzi | H01L 27/0248 |
| | | | 361/56 |
| 2018/0331093 A1* | 11/2018 | Takahashi | H02J 7/0034 |
| 2019/0066938 A1* | 2/2019 | Ishida | H01H 9/167 |
| 2019/0280472 A1* | 9/2019 | Easwaran | H04B 15/005 |
| 2020/0091704 A1 | 3/2020 | Huang et al. | |

FOREIGN PATENT DOCUMENTS

| | | |
|---|---|---|
| CN | 109450425 A | 3/2019 |
| JP | 2011135633 A | 7/2011 |
| JP | 2017073872 A | 4/2017 |

\* cited by examiner

GROUNDING SYSTEM AND CONTROL METHOD, INTEGRATED CIRCUITS AND INTEGRATED CIRCUIT PACKAGE THEREOF

CROSS-REFERENCE TO RELATED APPLICATIONS

This application claims priority to Chinese Patent Application No. 202410471764.2, filed on Apr. 19, 2024 and entitled "A Grounding System and Its Control Method, Integrated Circuits and Integrated Circuit Package," which is hereby incorporated by reference in its entirety.

TECHNICAL FIELD

This application relates generally to the field of electronic circuit technology, and particularly, to a grounding system and its control method, as well as integrated circuits and an integrated circuit package.

BACKGROUND

For devices equipped with integrated circuits (such as automotive integrated circuits), a common issue in practical applications is the potential damage to electronic components within the devices when users inadvertently reverse the polarity of the power supply due to improper usage. Therefore, protective measures need to be implemented to prevent damage to the electronic components within the devices when the power supply polarity is reversed. It is evident that implementing protective measures to ensure that any reverse current and reverse bias voltage are sufficiently low is particularly crucial to prevent damage to the electronic components within the devices.

SUMMARY

This application aims to provide a grounding system and its control method, as well as integrated circuits and an integrated circuit package, capable of maintaining normal operation of the system when the power supply polarity is correctly connected, and preventing damage to electronic components within the system when the power supply polarity is reversed.

To achieve the above objectives, in a first aspect, this application provides a grounding system comprising:

A first circuit portion, wherein a first terminal of the first circuit portion is connected to an input voltage bus, and a second terminal of the first circuit portion is connected to a first ground.

The first circuit portion comprises a high-side switch, and the first circuit portion is configured to receive an enable signal.

The high-side switch is connected between the input voltage bus and a voltage output terminal of the grounding system, and the high-side switch is configured to conduct in response to a first logic level in the enable signal.

A second circuit portion, wherein the second circuit portion is connected between the first ground and a second ground, and wherein the second circuit portion comprises a switch branch and a resistor branch.

The resistor branch is connected between the first ground and the second ground, and the resistor branch comprises at least one resistor.

The switch branch is connected between the first ground and the second ground, and comprises a first diode connected between the first ground and the second ground. The switch branch is configured to: when a positive terminal of a power supply is connected to the input voltage bus and a negative terminal of the power supply is connected to the second ground, establish a first current path between the first ground and the second ground and short-circuit the first diode, and when the positive terminal of the power supply is connected to the second ground and the negative terminal of the power supply is connected to the input voltage bus, disconnect the first current path and stop short-circuiting the first diode.

In an optional implementation, the switch branch is also configured to, in response to a negative voltage pulse applied to the input voltage bus, disconnect the first current path and stop short-circuiting the first diode.

In an optional implementation, the switch branch is also connected to the input voltage bus, and the switch branch is further configured to:

When the positive terminal of the power supply is connected to the input voltage bus and the negative terminal of the power supply is connected to the second ground, the switch branch responds to the voltage at the positive terminal of the power supply to establish the first current path and short-circuit the first diode.

When the positive terminal of the power supply is connected to the second ground and the negative terminal of the power supply is connected to the input voltage bus, the switch branch responds to the voltage at the negative terminal of the power supply to disconnect the first current path and stop short-circuiting the first diode.

In an optional implementation, the switch branch comprises a first switch transistor, wherein the first diode is the body diode of the first switching transistor.

The gate of the first switch transistor is connected to the input voltage bus, the source of the first switch transistor is connected to the first ground, and the drain of the first switch transistor is connected to the second ground.

In an optional implementation, the switch branch further comprises a first resistor and a first Zener diode.

The first resistor is connected between the input voltage bus and the gate of the first switch transistor, the anode of the first Zener diode is connected to the source of the first switch transistor, and the cathode of the first Zener diode is connected to the gate of the first switch transistor.

In an optional implementation, the first circuit portion comprises a low-dropout linear regulator, wherein the low-dropout linear regulator is connected between the input voltage bus and the switch branch.

The low-dropout linear regulator is configured to convert the voltage at the positive terminal of the power supply to a first voltage when the positive terminal of the power supply is connected to the input voltage bus and the negative terminal of the power supply is connected to the second ground.

The switch branch is also configured to establish the first current path and short-circuit the first diode in response to the first voltage.

In an optional implementation, the switch branch comprises a second switch transistor, wherein the first diode is the body diode of the second switch transistor.

The gate of the second switch transistor is connected to the output terminal of the low-dropout linear regulator, the input terminal of the low-dropout linear regulator is connected to the input voltage bus, the source of the second switch transistor is connected to the first ground, and the drain of the second switch transistor is connected to the second ground.

In an optional implementation, the switch branch is also configured to establish the first current path and short-circuit the first diode in response to a first logic level of the enable signal, and is configured to disconnect the first current path and stop short-circuiting the first diode in response to a second logic level of the enable signal, wherein the first logic level is different from the second logic level.

In an optional implementation, the first circuit portion further comprises a first transistor and a second transistor.

The drain of the first transistor receives an error current, where the error current is the difference between the current flowing through the high-side switch and a preset reference current.

The drain of the first transistor is connected to the gate of the first transistor and the gate of the second transistor, the source of the first transistor and the source of the second transistor are both connected to the first ground, and the drain of the second transistor is connected to the gate of the high-side switch.

In an optional implementation, the first circuit portion further comprises a fourth switch transistor and a second diode.

The source of the fourth switch transistor and the cathode of the second diode are connected to the drain of the second transistor, and the drain of the fourth switch transistor and the anode of the second diode are connected to the gate of the high-side switch.

The fourth switch transistor is configured to conduct when the enable signal is at a first logic level to short-circuit the second diode and is configured to turn off when the enable signal is at a second logic level.

In an optional implementation, the first circuit portion further comprises a second Zener diode, a second resistor, a first current source, and a second current source.

The anode of the second Zener diode, the negative terminal of the second current source, and the positive terminal of the first current source are all connected to the gate of the high-side switch. The cathode of the second Zener diode is connected to the input voltage bus. The second resistor is connected between the gate of the high-side switch and the voltage output terminal. The negative terminal of the first current source is connected to a bias voltage. The positive terminal of the second current source is connected to the voltage output terminal.

In an optional implementation, the switch branch comprises a third switching transistor, wherein the first diode is the body diode of the third switch transistor.

The third switch transistor is configured to conduct in response to a first logic level of the enable signal, to establish the first current path and short-circuit the first diode.

The third switch transistor is also configured to turn off in response to a second logic level of the enable signal, to disconnect the first current path and stop short-circuiting the first diode.

In an optional implementation, the switch branch further comprises a fourth resistor, a fifth resistor, and a third Zener diode.

The fourth resistor is connected between the gate and the source of a switch transistor in the switch branch. The anode of the third Zener diode is connected to the gate of the switch transistor in the switch branch, and the cathode of the third Zener diode is connected to the drain of the switch transistor in the switch branch, wherein the switch transistor in the switch branch is either the second switch transistor or the third switch transistor.

The first terminal of the fifth resistor receives the voltage output of the low-dropout linear regulator or the enable signal, and the second terminal of the fifth resistor is connected to the gate of the switch transistor in the switch branch.

In an optional implementation, the grounding system further comprises a third circuit portion, wherein the third circuit portion is connected between the second circuit portion and the second ground, and the third circuit portion is used to generate a voltage drop to reduce the voltage across the first diode; the switch branch is also configured to, when a negative voltage pulse is applied to the input voltage bus, establish a second current path between the second ground and the first ground and short-circuit the first diode.

In an optional implementation, the third circuit portion comprises a sixth resistor.

The sixth resistor is connected between the cathode of the first diode and the second ground.

In a second aspect, this application provides a control method based on a grounding system, wherein the grounding system comprises a first circuit portion connected between an input voltage bus and a first ground, and a second circuit portion connected between the first ground and a second ground. The first circuit portion comprises a high-side switch, wherein the high-side switch is connected between the input voltage bus and a voltage output terminal of the grounding system.

The method comprises, when a positive terminal of a power supply is connected to the input voltage bus and a negative terminal of the power supply is connected to the second ground, configuring the switch transistor in the second circuit portion to conduct, to establish a first current path between the first ground and the second ground.

The method further comprises, when the positive terminal of the power supply is connected to the second ground and the negative terminal of the power supply is connected to the input voltage bus, configuring the switch transistor in the second circuit portion to turn off, to disconnect the first current path.

In an optional implementation, the method further comprises:

Configuring the switch transistor in the second circuit portion to turn off when a negative voltage pulse is applied to the input voltage bus.

In an optional implementation, the grounding system further comprises a third circuit portion connected between the second circuit portion and the second ground, and the method further comprises the following.

When a negative voltage pulse is applied to the input voltage bus, the method comprises configuring the switch transistor in the second circuit portion to conduct in response to the negative voltage pulse, to establish a second current path between the second ground and the first ground, and generating a voltage drop through the third circuit portion to reduce the voltage across the body diode of the switch transistor in the second circuit portion.

In an optional implementation, the first circuit portion comprises a high-side switch, a first transistor, a second transistor, a fourth switch transistor, and a second diode, wherein the high-side switch is connected between the input voltage bus and the voltage output terminal of the grounding system. The drain of the first transistor receives an error current, where the error current is obtained as the difference between the current flowing through the high-side switch and a preset reference current. The drain of the first transistor is connected to the gate of the first transistor and the gate of the second transistor, the source of the first transistor and the source of the second transistor are both connected to the first ground, the drain of the second transistor is connected to the source of the fourth switch transistor and the cathode of the second diode, and the drain of the fourth switch transistor is connected to the anode of the second diode and the gate of the high-side switch. The method further comprises the following.

In response to a first logic level in the enable signal, the method further comprises configuring the high-side switch to conduct, and configuring the fourth switch transistor to conduct, to short-circuit the second diode.

In response to a second logic level in the enable signal, the method further comprises configuring the high-side switch to turn off, and configuring the fourth switch transistor to turn off.

In a third aspect, this application provides an integrated circuit die comprising the first circuit portion and the second circuit portion of the grounding system as described above.

In a fourth aspect, this application provides an integrated circuit package comprising a lead frame, adhesive, and the integrated circuit die as described above.

The adhesive is located between the lead frame and the substrate of the integrated circuit die and is used to bond the integrated circuit die to the lead frame, wherein the adhesive is configured to be thermally conductive and electrically insulating.

In a fifth aspect, this application provides an electronic device comprising the integrated circuit as described above.

According to another aspect of the present application, a grounding system is provided that includes: a first circuit portion configured to receive an enable signal, wherein, a first terminal of the first circuit portion is connected to an input voltage bus, and a second terminal of the first circuit portion is a first ground, and the first circuit portion comprises a high-side switch connected between the input voltage bus and a voltage output terminal of the grounding system, and the high-side switch is configured to turn on in response to the enable signal being at a first logic level; and a second circuit portion comprising a switch branch and a resistor branch, wherein, the resistor branch and the switch branch are both connected between the first ground and a second ground, the resistor branch comprises at least one resistor, and the switch branch comprises a first diode connected between the first ground and the second ground, and the switch branch is configured to establish a first current path between the first ground and the second ground and to short the first diode when a positive terminal of a power supply is connected to the input voltage bus and a negative terminal of the power supply is connected to the second ground, and the switch branch is further configured to disconnect the first current path and stop shorting the first diode when the positive terminal of the power supply is connected to the second ground and the negative terminal of the power supply is connected to the input voltage bus.

According to another aspect of the present application, a control method based on a grounding system is provided. The grounding system comprises a first circuit portion connected between an input voltage bus and a first ground, and a second circuit portion connected between the first ground and a second ground, the first circuit portion comprising a high-side switch connected between the input voltage bus and a voltage output terminal of the grounding system. The control method includes: configuring a switch in the second circuit portion to turn on when a positive terminal of a power supply is connected to the input voltage bus and a negative terminal of the power supply is connected to the second ground, to establish a first current path between the first ground and the second ground; and configuring the switch in the second circuit portion to turn off when the positive terminal of the power supply is connected to the second ground and the negative terminal of the power supply is connected to the input voltage bus, to disconnect the first current path.

According to another aspect of the present application, an integrated circuit is provided that includes: a first circuit portion configured to receive an enable signal, wherein a first terminal of the first circuit portion is connected to an input voltage bus, and a second terminal of the first circuit portion is a first ground, and the first circuit portion comprises a high-side switch connected between the input voltage bus and a voltage output terminal, and the high-side switch is configured to turn on in response to the enable signal being at a first logic level; and a second circuit portion comprising a switch branch and a resistor branch, wherein, the switch branch and the resistor branch are both connected between the first ground and the second ground, the resistor branch comprises at least one resistor, and the switch branch comprises a first diode connected between the first ground and the second ground, and the switch branch is configured to establish a first current path between the first ground and the second ground and to short the first diode when a positive terminal of a power supply is connected to the input voltage bus and a negative terminal of the power supply is connected to the second ground, and the switch branch is configured to disconnect the first current path and stop shorting the first diode when the positive terminal of the power supply is connected to the second ground and the negative terminal of the power supply is connected to the input voltage bus.

According to another aspect of the present application, an integrated circuit package is provided that includes a lead frame, adhesive, and the integrated circuit according to the preceding aspect. The adhesive is placed between the lead frame and the integrated circuit to bond the lead frame to the integrated circuit, and the adhesive is configured to be thermally conductive and electrically non-conductive. An electronic device is also provided that includes the integrated circuit according to the preceding aspect.

The beneficial effects of this application are as follows. A grounding system provided comprises a first circuit portion and a second circuit portion. One terminal of the first circuit portion is connected to an input voltage bus and another terminal is connected to a first ground. The second circuit portion is connected between the first ground and a second ground, comprising a switch branch and a resistor branch. The resistor branch, comprising at least one resistor, is connected between the first ground and the second ground. The switch branch, comprising a diode connected between the first ground and the second ground, is configured to establish a first current path between the first ground and the second ground and short the diode when the positive terminal of a power supply is connected to the input voltage bus and the negative terminal of the power supply is connected to the second ground. Conversely, it disconnects the first current path and stops the short circuit when the positive terminal of the power supply is connected to the second ground and the negative terminal of the power supply is connected to the input voltage bus. Through this process, it ensures the normal operation of the grounding system by establishing the first current path between the first ground and the second ground when the power supply polarity is connected correctly, while simultaneously shorting the diode to prevent adverse effects on the functionality of the first circuit portion due to voltage drop across the diode. Moreover, it disconnects the first current path and stops the short circuit when the power supply polarity is reversed, thereby reverse biasing the diode and preventing damage to electronic devices connected to the grounding system.

BRIEF DESCRIPTION OF DRAWINGS

One or more embodiments are illustratively described with reference to the accompanying drawings, which do not limit the embodiments. Elements in the drawings with the same reference numerals represent similar elements. Unless specifically stated, the drawings are not to scale.

DETAILED DESCRIPTION OF ILLUSTRATIVE EMBODIMENTS

In order to make the purpose, technical solution, and advantages of the embodiments of the present application clearer, the technical solutions in the embodiments of the present application will be described clearly and completely with reference to the accompanying drawings. Obviously, the described embodiments are part of the embodiments of the present application, not all embodiments. Based on the embodiments in the present application, all other embodiments obtained by those skilled in the art without creative work are within the scope of protection of the present application.

Figure 1:
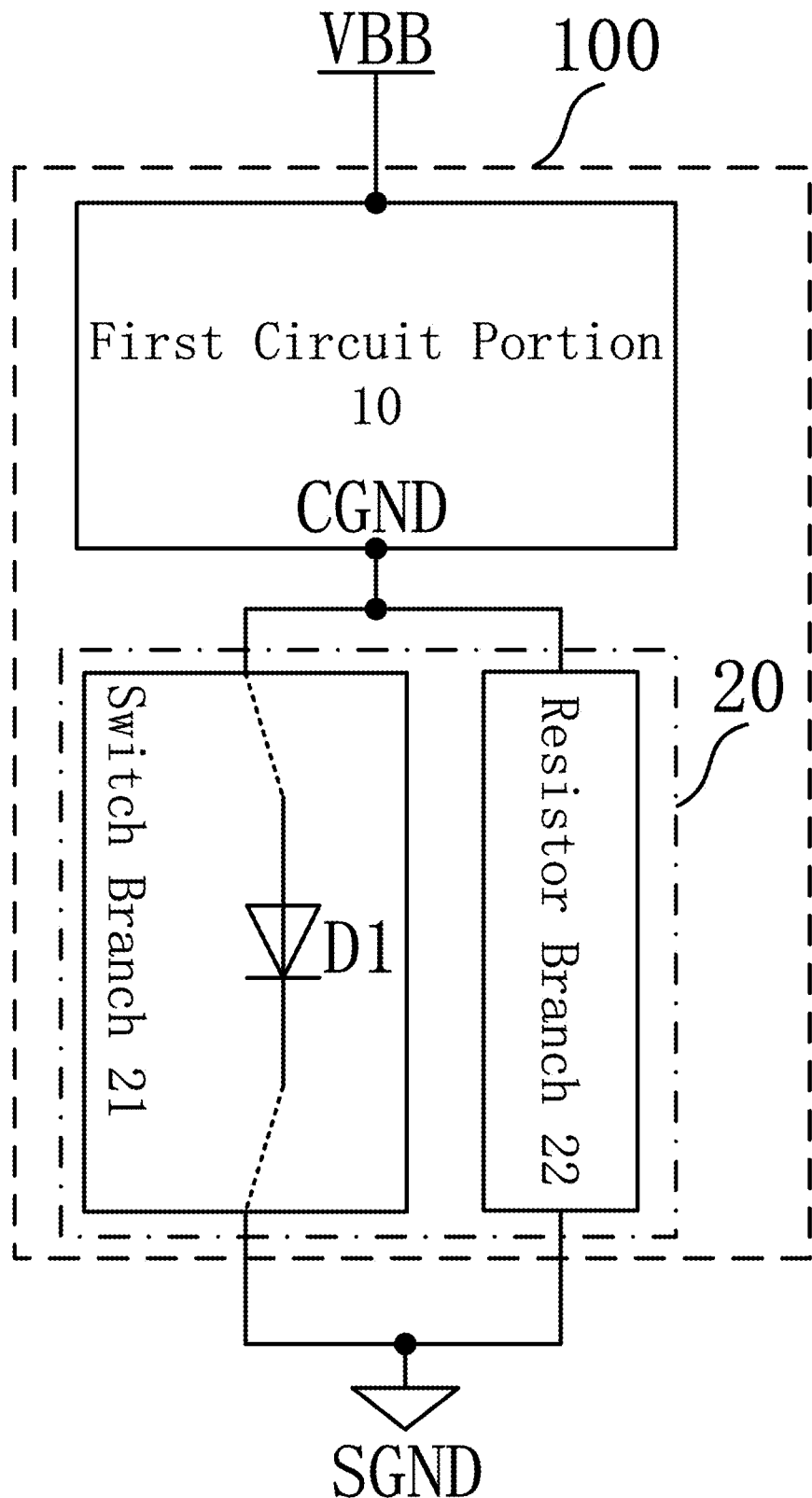
FIG. 1 is a schematic diagram of a grounding system provided in an embodiment of the present application.

Please refer to FIG. 1. FIG. 1 is a schematic diagram of a structure of a grounding system provided in an embodiment of the present application. As shown in FIG. 1, the grounding system 100 comprises a first circuit portion 10 and a second circuit portion 20.

In FIG. 1, a first terminal of the first circuit portion 10 is connected to an input voltage bus VBB, and a second terminal of the first circuit portion 10 is a first ground CGND (i.e. circuit ground). The second circuit portion 20 is connected between the first ground CGND and a second ground SGND (i.e. system ground), and the second circuit portion 20 comprises a switch branch 21 and a resistor branch 22.

The resistor branch 22 is connected between the first ground CGND and the second ground SGND, and it comprises at least one resistor. The resistor branch 22 is capable of limiting current.

The switch branch 21 is connected between the first ground CGND and the second ground SGND. The switch branch 21 comprises a diode D1 connected between the first ground CGND and the second ground SGND, where the anode of the diode D1 is connected to the first ground CGND, and the cathode of the diode D1 is connected to the second ground SGND. The switch branch 21 is configured to establish a first current path between the first ground CGND and the second ground SGND, and to short-circuit the diode D1 when the positive terminal of a power supply (e.g., a battery) is connected to the input voltage bus VBB, and the negative terminal of the power supply is connected to the second ground SGND. The switch branch 21 is also configured to disconnect the first current path and stop short-circuiting the diode D1 when the positive terminal of the power supply is connected to the second ground SGND and the negative terminal of the power supply is connected to the input voltage bus VBB.

In this embodiment, the power supply is a device that provides electrical energy. In one implementation, the power supply may be a battery. The first current path is a path through which the current flows from the first ground CGND to the second ground SGND.

In this embodiment, when the positive terminal of the power supply is connected to the input voltage bus VBB and the negative terminal of the power supply is connected to the second ground SGND (i.e., the polarity of the power supply is connected correctly), the first current path is established, and the grounding system 100 can operate normally. Additionally, the diode D1 is short-circuited, which prevents the voltage drops across the diode D1 from affecting the functionality of the first circuit portion 10.

When the positive terminal of the power supply is connected to the second ground SGND and the negative terminal of the power supply is connected to the input voltage bus VBB (i.e., the polarity of the power supply is connected in reverse), the first current path is disconnected. Additionally, the diode D1 is no longer short-circuited. Due to the reversed polarity of the power supply, the voltage applied to the cathode of the diode D1 is greater than the voltage at its anode, causing the diode D1 to reverse bias and block the flow of current from the second ground SGND to the input voltage bus VBB. Meanwhile, the resistor branch 22 effectively limits the reverse current flowing from the second ground SGND to the input voltage bus VBB. As a result, the current flowing through the grounding system is reduced, which helps prevent damage to electronic devices in the grounding system 100.

As used herein, when the positive terminal of the power supply is connected to the input voltage bus VBB and the negative terminal of the power supply is connected to the second ground SGND, this case is referred to as the power supply being connected (e.g., to the grounding system) in polarity or in forward/correct polarity, or the power supply polarity being connected correctly; and when the positive terminal of the power supply is connected to the second ground SGND and the negative terminal of the power supply is connected to the input voltage bus VBB, this case is referred to as the power supply being connected (e.g., to the grounding system) in reverse polarity, or the power supply polarity being connected reversely.

In one embodiment, the switch branch 21 may also be configured to, in response to a negative voltage pulse input to the input voltage bus VBB, disconnect the first current path and stop short-circuiting the diode D1.

Specifically, in scenarios where an inductive load is connected to a voltage input terminal of the grounding system 100 and the power supply is disconnected from the connection to the input voltage bus VBB, transient conducted interference may occur on the input voltage bus VBB due to the parallel connection of the inductive load with the grounding system 100. By inputting negative voltage pulses to the input voltage bus VBB, it is possible to simulate the aforementioned transient conducted interference. In such cases, by disconnecting the first current path and ceasing to short-circuit the diode D1, it is possible to block the flow of current from the second ground SGND to the input voltage bus VBB, thereby reducing the risk of damage to electronic devices in the grounding system 100. In some embodiments, the negative voltage pulse is configured to be −150V with a duration of 2 milliseconds, and it is a pulse signal with an internal resistance of 10 ohms.

Figure 2:
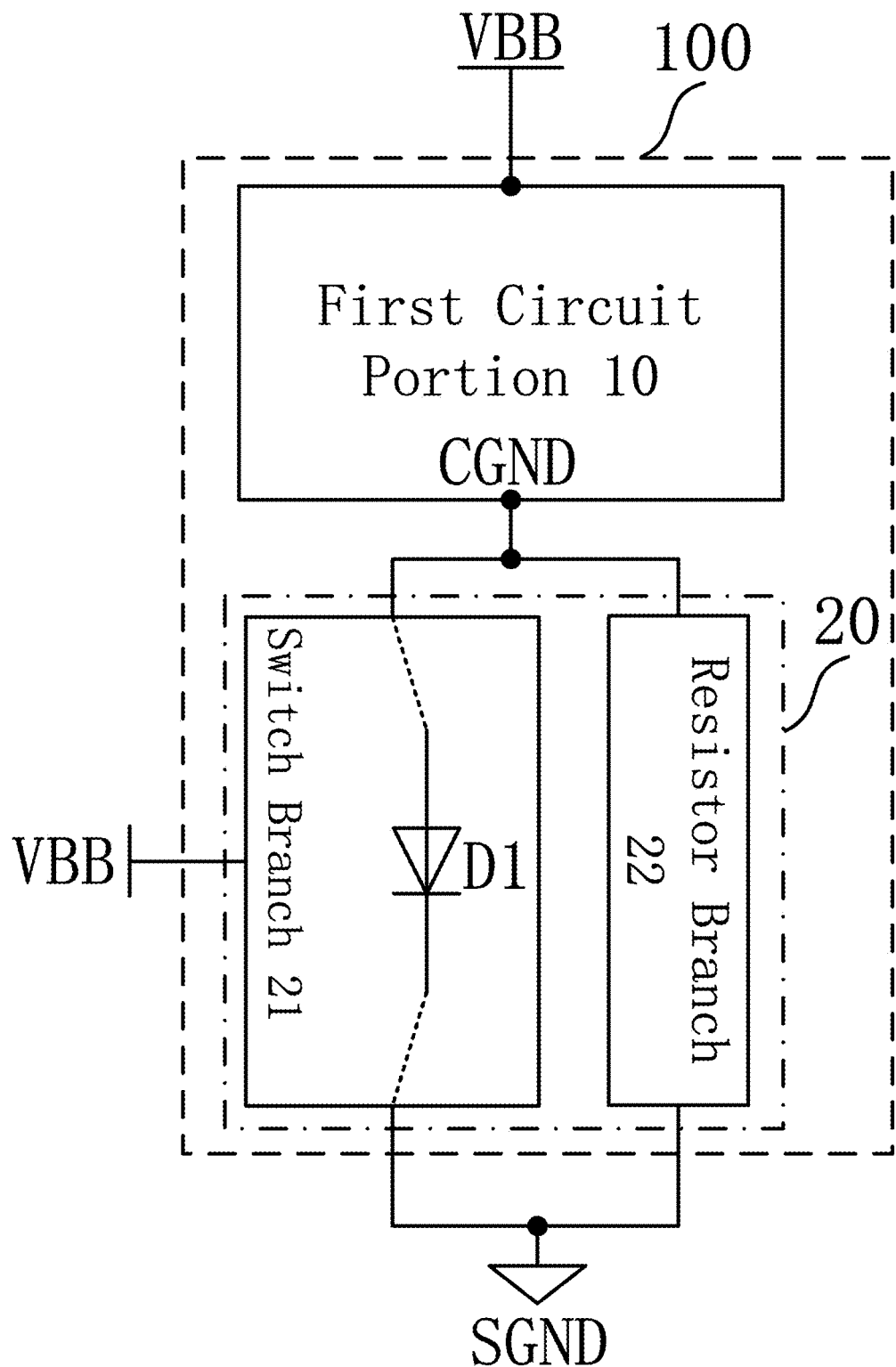
FIG. 2 is a schematic diagram of another grounding system provided in an embodiment of the present application.

Please refer to FIG. 2. FIG. 2 depicts the structure of the switch branch 21 when using a first control method, according to an embodiment of the present application. In one embodiment, as shown in FIG. 2, the switch branch 21 is also connected to the input voltage bus VBB.

In this embodiment, the switch branch 21 is controlled by the input voltage bus VBB. Specifically, the switch branch 21 is configured to establish the first current path and to short-circuit the first diode D1 in response to the voltage at the positive terminal of the power supply when the positive terminal of the power supply is connected to the input voltage bus VBB and the negative terminal of the power supply is connected to the second ground SGND. The switch branch 21 is also configured to disconnect the first current path and stop short-circuiting the first diode D1 in response to the voltage at the negative terminal of the power supply when the negative terminal of the power supply is connected to the input voltage bus VBB, and the positive terminal of the power supply is connected to the second ground SGND.

Figure 3:
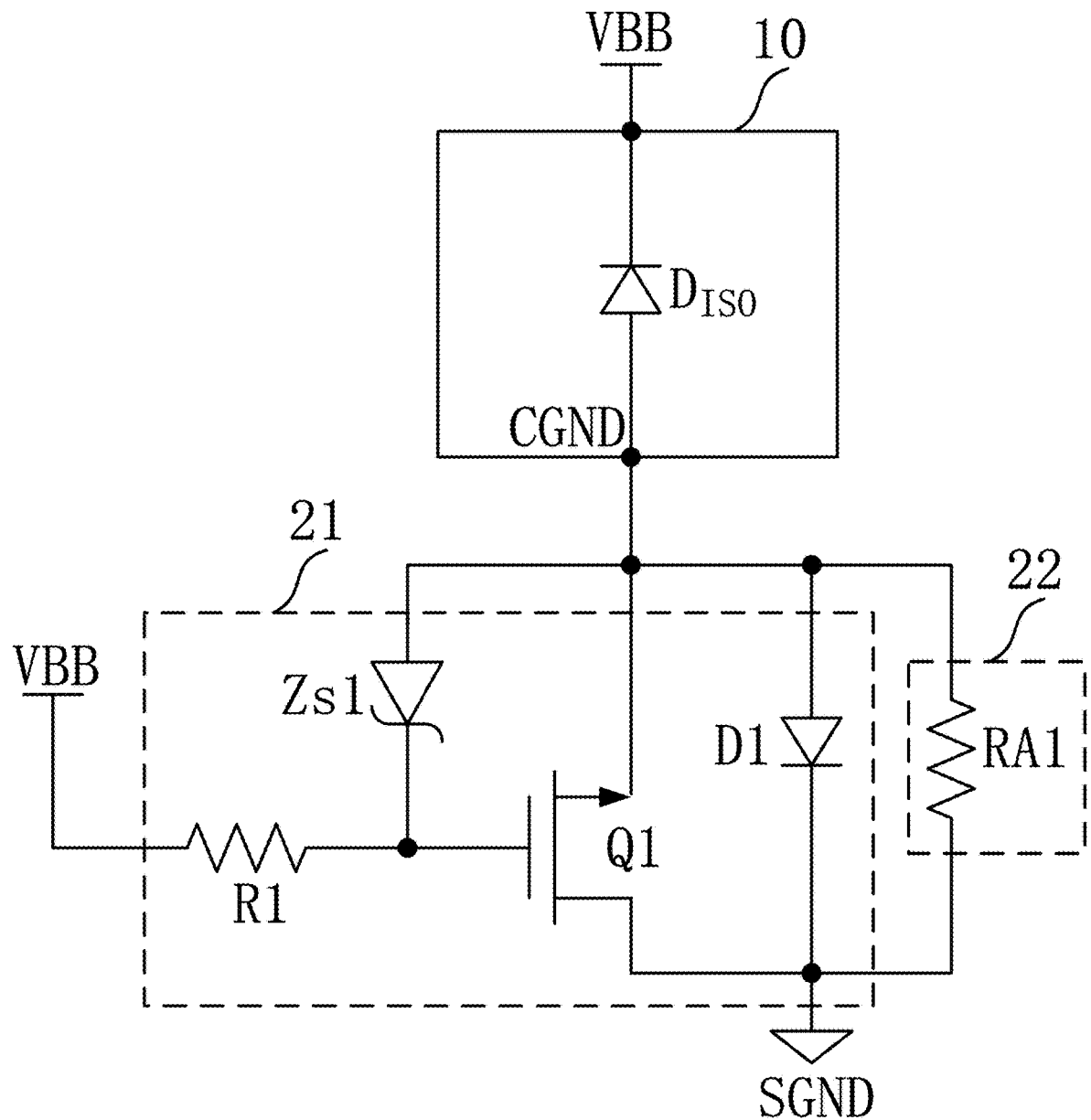
FIG. 3 is a schematic diagram of a circuit corresponding to the grounding system shown in FIG. 2.

Please refer to FIG. 3, which exemplifies a circuit structure corresponding to the configuration shown in FIG. 2. As shown in FIG. 3, the switch branch 21 includes a first switch transistor Q1. Additionally, the first diode D1 is the body diode of the first switch transistor Q1. When the first switch transistor Q1 is turned off, the first diode D1 is used to isolate the negative voltage resulting from connecting the power supply to the grounding system 100 in reverse polarity.

In FIG. 3, the gate of the first switch transistor Q1 is connected to the input voltage bus VBB, the source of the first switch transistor Q1 is connected to the first ground CGND, and the drain of the first switch transistor Q1 is connected to the second ground SGND.

In this embodiment, the switch branch 21 also includes a first resistor R1 and a first Zener diode Zs1.

The first resistor R1 is connected between the input voltage bus VBB and the gate of the first switch transistor Q1, the anode of the first Zener diode Zs1 is connected to the source of the first switch transistor Q1, and the cathode of the first Zener diode Zs1 is connected to the gate of the first switch transistor Q1.

Also, in this embodiment, the resistor branch 22 includes a resistor RA1 as an example. The resistor RA1 is mainly used to limit the reverse current. The diode $D_{ISO}$ is a parasitic diode between the input voltage bus VBB and the first ground CGND. In some embodiments, if the first circuit portion 10 is located in an integrated circuit, the parasitic diode $D_{ISO}$ represents the parasitic PN junction between the N-type doped region connected to the input voltage bus VBB and the P-type substrate connected to the first ground CGND (i.e., the ground of the integrated circuit).

In this embodiment, when the grounding system 100 operates normally (i.e., with the power supply connected with the correct polarity), the voltage of the power supply is applied to the input voltage bus VBB and in turn applied to the gate of the first switch transistor Q1, and the first Zener diode Zs1 clamps the voltage difference between the gate and source of the first switch transistor Q1, thereby turning on the first switch transistor Q1. At this time, on one hand, due to the conduction of the first switch transistor Q1, the first diode D1 is short-circuited. On the other hand, because the conduction resistance of the first switch transistor Q1 is small and the current flowing through the first switch transistor Q1 is also small, the voltage drop generated on the first switch transistor Q1 is much smaller than the forward conduction voltage drop of the first diode D1. As a result, the excessive voltage difference between the first ground CGND and the second ground SGND does not adversely affect the function of the first circuit portion 10.

It should be noted that since the gate of the first switch transistor Q1 is directly powered by the power supply, in some applications (such as automotive applications), the range and transient disturbances of the power supply may be large. Therefore, the first Zener diode Zs1 is needed to clamp and protect the gate of the first switch transistor Q1. At the same time, the first resistor R1 is set up to control the current flowing through the first Zener diode Zs1 after clamping.

When the grounding system 100 is in a state where the power supply is connected in reverse polarity, the second ground SGND is connected to the positive terminal of the power supply, and the input voltage bus VBB is connected to the negative terminal of the power supply. At this time, due to the presence of the parasitic diode $D_{ISO}$ between the input voltage bus VBB and the first ground CGND, the voltage of the first ground CGND is raised to 0.7V (assuming the forward conduction voltage drop of the diode $D_{ISO}$ is 0.7V as an example). At this point, the gate-source voltage of the first switch transistor Q1 is negative, and the first switch transistor Q1 remains turned off. The body diode of the first switch transistor Q1 (i.e., the first diode D1) then serves to block the reverse voltage.

When a negative voltage pulse (assuming a voltage pulse of −150V as an example) is applied to the input voltage bus VBB, due to the clamping action of the diode $D_{ISO}$, the voltage of the first ground CGND is approximately −149.3V, and the gate-source voltage of the first switch transistor Q1 is negative, keeping the first switch transistor Q1 turned off. The first diode D1 takes on almost all of the reverse voltage. It can be seen that, in this embodiment, a device that can withstand a voltage exceeding 150V needs to be selected as the first switch transistor Q1.

Figure 4:
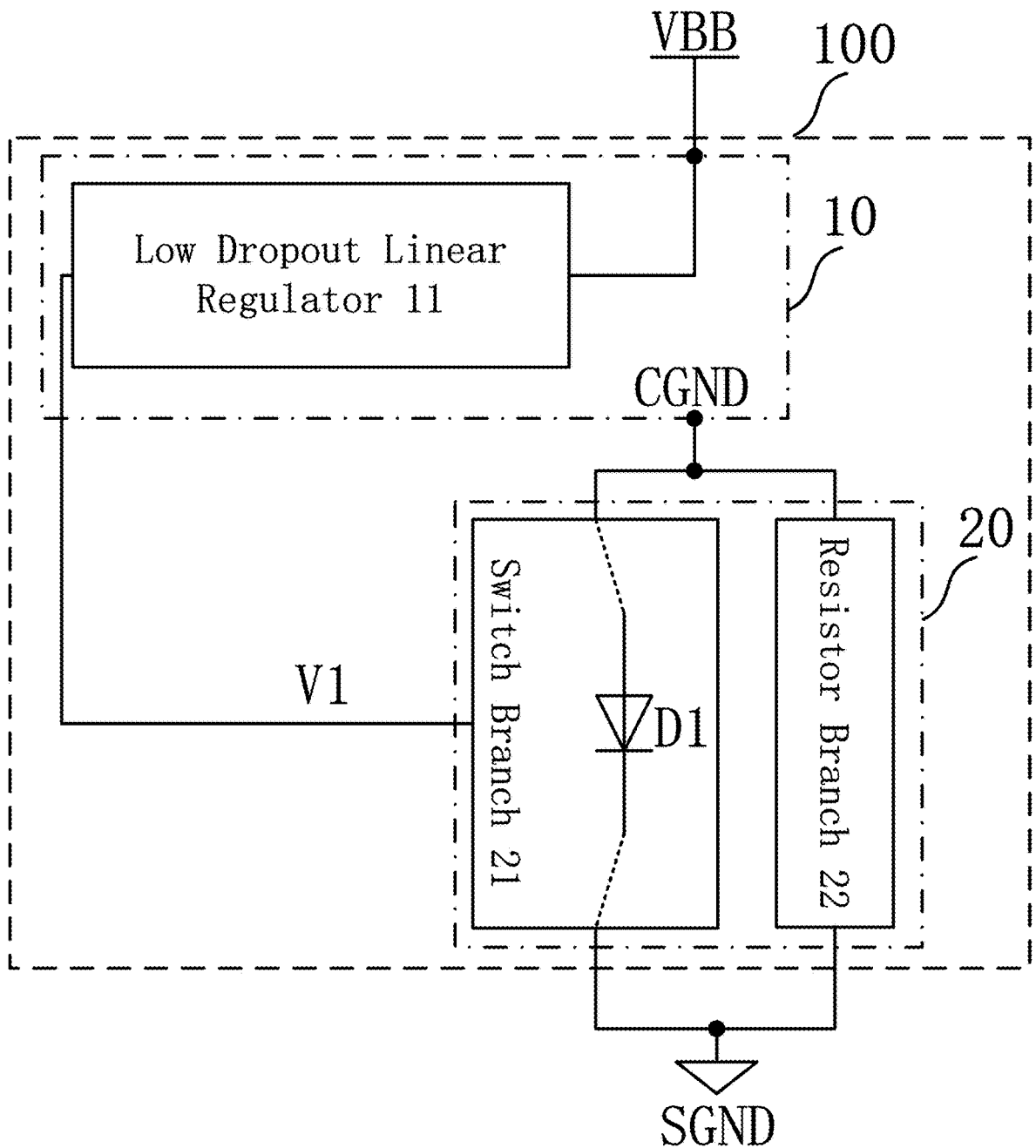
FIG. 4 is a schematic diagram of yet another grounding system provided in an embodiment of the present application.

Please refer to FIG. 4. FIG. 4 illustrates a structure of a grounding system 100 where a second control method is utilized for the switch branch 21, according to an embodiment of the present application. In the embodiment, as shown in FIG. 4, the first circuit portion 10 includes a low dropout regulator (LDO) 11. The low dropout regulator 11 regulates the input voltage (e.g., in this embodiment, the voltage applied to the input voltage bus VBB) to an output voltage (e.g., in this embodiment, a first voltage), and the voltage difference between the input voltage and the output voltage may be very small. The low dropout regulator 11 is connected between the input voltage bus VBB and the switch branch 21.

Specifically, the low dropout regulator 11 is configured to convert the voltage at the positive terminal of the power supply to the first voltage V1, when the positive terminal of the power supply is connected to the input voltage bus VBB, and the negative terminal of the power supply is connected to the second ground SGND. The switch branch 21 is also configured to, in response to the first voltage V1, establish the first current path and short-circuit the first diode D1. When the positive terminal of the power supply is connected to the second ground SGND and the negative terminal of the power supply is connected to the input voltage bus VBB, both the input voltage and output voltage of the low dropout regulator 11 are zero. In this case, the switch branch 21 disconnects the first current path and stops short-circuiting the first diode D1. The difference between this embodiment and the one shown in FIG. 2 is that, in the embodiment shown in FIG. 2, the switch branch 21 is controlled by the voltage at the input voltage bus VBB, and in the embodiment shown in FIG. 4, the switch branch 21 is controlled by the voltage output from the low dropout regulator 11.

Figure 5:
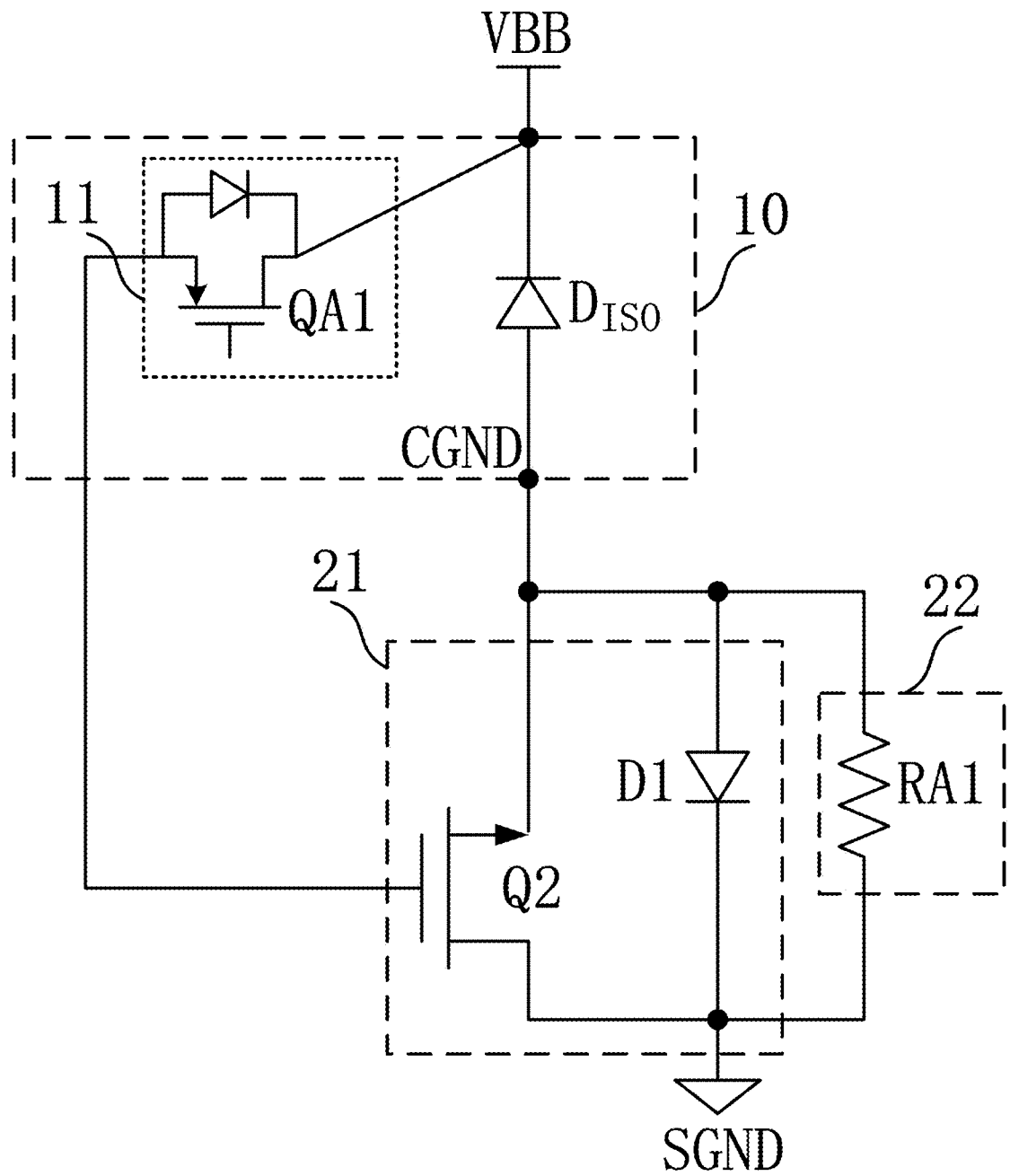
FIG. 5 is a schematic diagram of a circuit corresponding to the grounding system shown in FIG. 4.

Please refer to FIG. 5. FIG. 5 exemplifies a circuit structure corresponding to the grounding system 100 shown in FIG. 4. As shown in FIG. 5, the switch branch 21 comprises a second switch transistor Q2. The first diode D1 is the body diode of the second switch transistor Q2. When the second switch transistor Q2 is turned off, the first diode D1 is used to isolate the negative voltage resulting from the reversal of the power supply polarity (i.e., when the power supply is connected in reverse polarity).

In this example, the gate of the second switch transistor Q2 is connected to an output terminal of the low dropout regulator 11. An input terminal of the LDO 11 is connected to the input voltage bus VBB, the source terminal of the second switch transistor Q2 is connected to the first ground CGND, and the drain terminal of the second switch transistor Q2 is connected to the second ground SGND. In some embodiments, the LDO 11 is also used to provide power to other circuit modules within the first circuit portion 10 in response to the connection of the positive terminal of the power supply to the input voltage bus VBB.

Further, in this embodiment, the resistor branch 22 may include a resistor RA1, as an example. The resistor RA1 may primarily be used to limit reverse current. The diode $D_{ISO}$ is a parasitic diode between the input voltage bus VBB and the first ground CGND.

Specifically, in contrast to the embodiment shown in FIG. 3, in this embodiment, the gate of the second switch transistor Q2 is driven by the first voltage V1 output by the low dropout linear regulator 11. The advantage of this approach is that the first voltage V1 is a fixed supply voltage (such as 5V), which is a regulated output of the power supply through the low dropout linear regulator 11. Because the first voltage V1 is fixed and controllable, overcurrent and overvoltage protection for the gate of the second switch transistor Q2 is not required, thus reducing the need for Zener diodes and saving costs.

In this embodiment, when the grounding system 100 operates normally (i.e., with power supply polarity connected correctly), the voltage from the positive terminal of the power supply is converted into the stable first voltage V1 by the low dropout linear regulator 11. This first voltage V1 is applied to the gate of the second switch transistor Q2, causing the second switch transistor Q2 to turn on. In this case, on the one hand, due to the conduction of the second switch transistor Q2, the first diode D1 is shorted. On the other hand, because the conduction resistance of the second switch transistor Q2 is small and the current flowing through the second switch transistor Q2 is not large, the voltage drop generated across the second switch transistor Q2 is much smaller than the forward conduction voltage drop of the first diode D1. As a result, the voltage difference between the first ground CGND and the second ground SGND does not adversely affect the functioning of the first circuit portion 10.

When the grounding system 100 operates with the reversely connected power supply, the second ground SGND is connected to the positive terminal of the power supply, and the input voltage bus VBB is connected to the negative terminal of the power supply. In this case, due to the presence of the parasitic diode $D_{ISO}$ between the input voltage bus VBB and the first ground CGND, the voltage of the first ground CGND is raised to 0.7V (assuming, as an example, a forward conduction voltage drop of 0.7V for the diode $D_{ISO}$). Because of the reverse polarity connection of the power supply, the first voltage V1 is also raised to 0.7V, due to the presence of the body diode of the transistor QA1 in the low dropout linear regulator 11. At this time, the gate-source voltage of the second switch transistor Q2 is zero, keeping it turned off. The body diode of the first switch transistor Q2 (i.e., the first diode D1) serves to isolate the reverse voltage.

Figure 6:
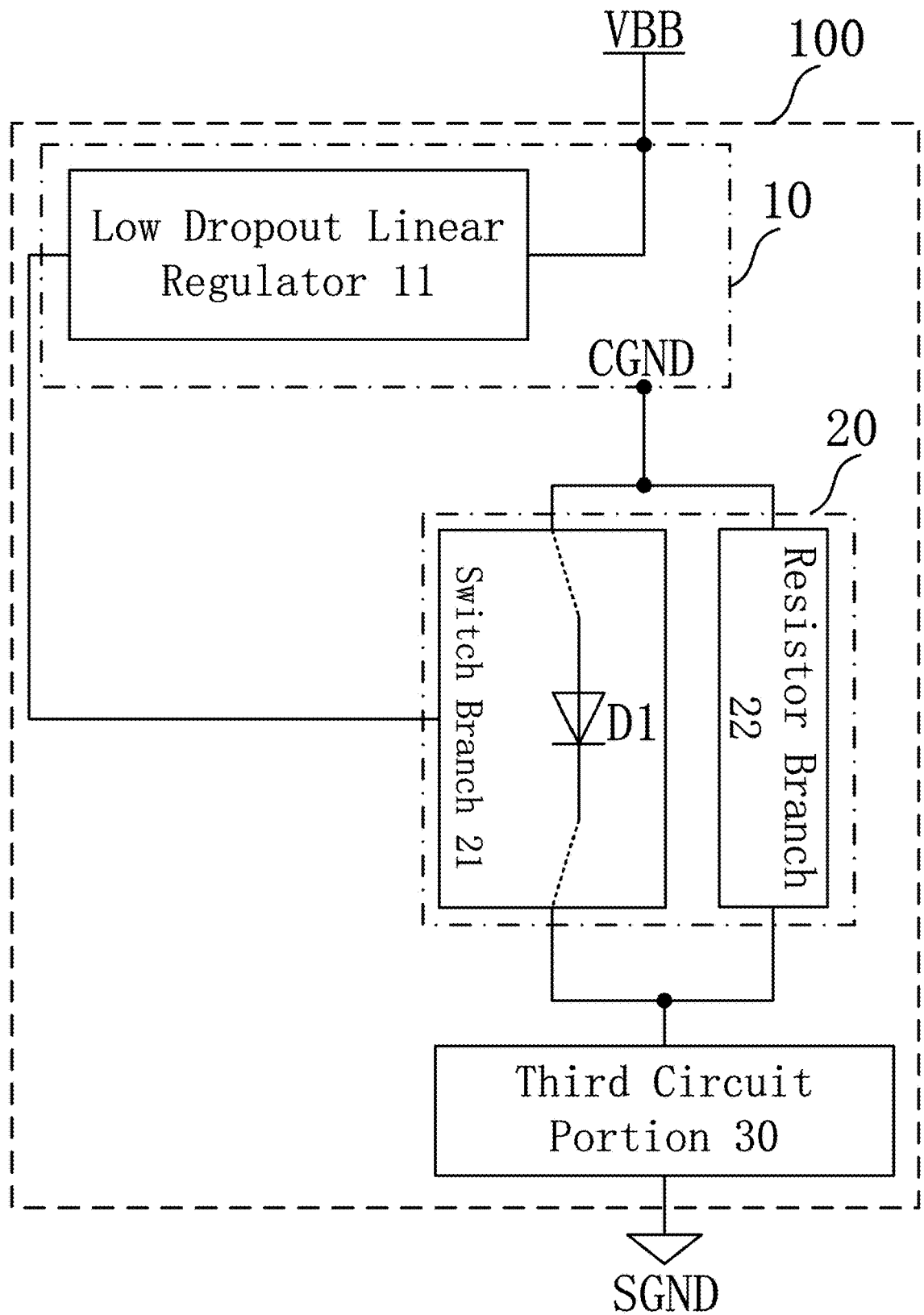
FIG. 6 is a schematic diagram of yet another grounding system provided in an embodiment of the present application.

Please refer to FIG. 6, which shows a structure having a third circuit portion 30 added based on the structure shown in FIG. 4, to achieve protection for the entire grounding system 100 when a negative voltage pulse is applied to the input voltage bus VBB.

As shown in FIG. 6, the grounding system 100 also includes the third circuit portion 30. The third circuit portion 30 is connected between the second circuit portion 20 and the second ground SGND. The third circuit portion 30 is used to generate a voltage drop to reduce the voltage across the first diode D1. Additionally, in this embodiment, the switch branch 21 is further configured to establish a second current path between the second ground SGND and the first ground CGND and to short-circuit the first diode D1 when a negative voltage pulse is input to the input voltage bus VBB. The second current path allows current to flow from the second ground SGND to the first ground CGND.

In this embodiment, when a negative voltage pulse is applied to the input voltage bus VBB, the second current path is established allowing current to flow from the second ground SGND to the input voltage bus VBB. However, with the presence of the third circuit portion 30, the third circuit portion 30 can bear most of the voltage from the negative voltage pulse. This means that the voltage that the switch branch 21 needs to withstand remains relatively low. Consequently, components with lower voltage ratings can be used, thereby reducing costs while still protecting the grounding system 100.

Figure 7:
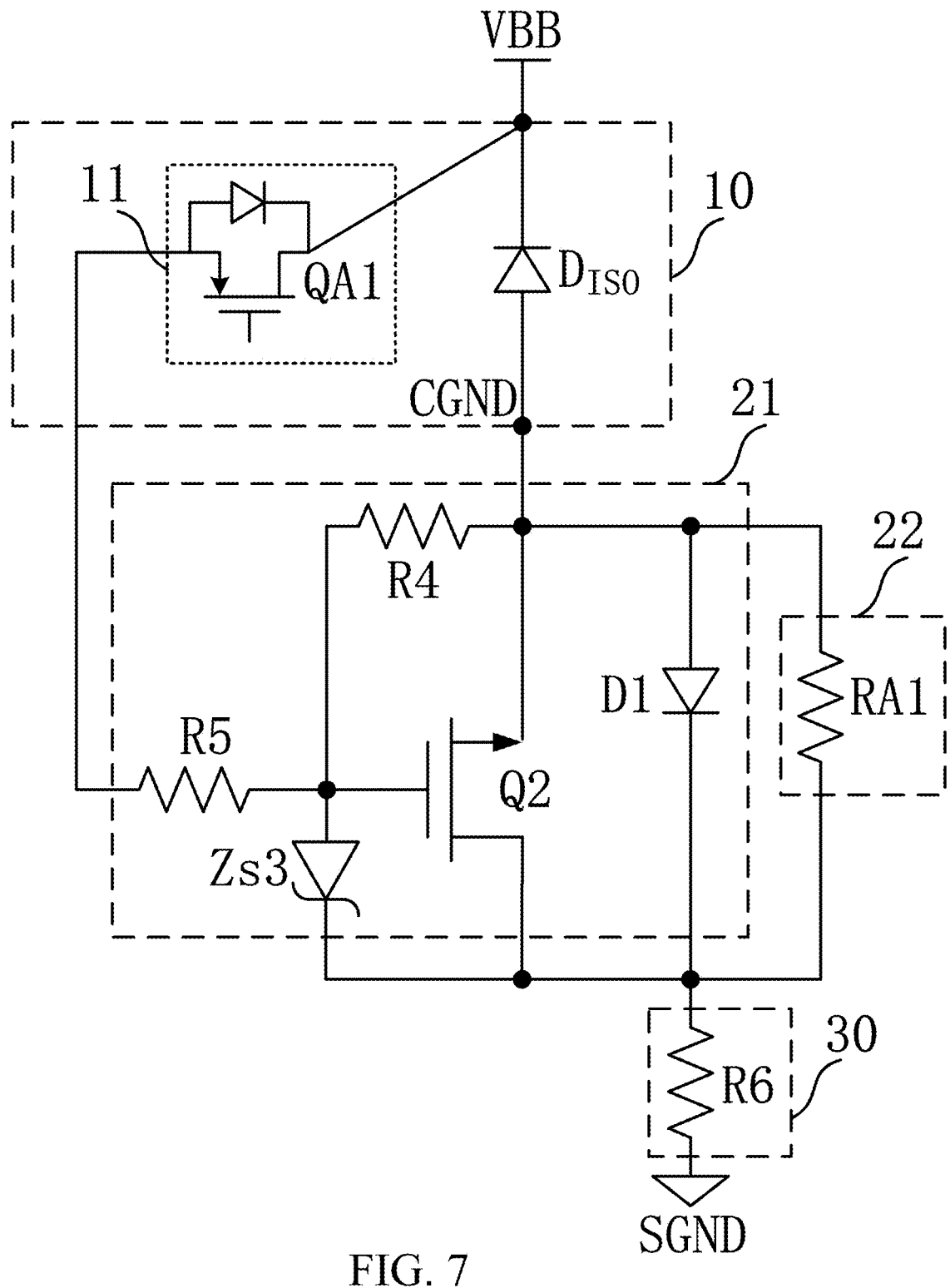
FIG. 7 is a schematic diagram of a circuit corresponding to the grounding system shown in FIG. 6.

Please refer to FIG. 7, which illustratively shows a circuit structure corresponding to the grounding system in FIG. 6.

As shown in FIG. 7, the switch branch 21 further comprises a fourth resistor R4, a fifth resistor R5, and a third Zener diode Zs3.

The fourth resistor R4 is connected between the gate and source of a switch transistor (i.e., the second switch transistor Q2) in the switch branch 21. The anode of the third Zener diode Zs3 is connected to the gate of the second switch transistor Q2. The cathode of the third Zener diode Zs3 is connected to the drain of the second switch transistor Q2. A first terminal of the fifth resistor R5 is connected to the low dropout regulator (LDO) 11 to receive the voltage output by the LDO 11. A second terminal of the fifth resistor R5 is connected to the gate of the second switch transistor Q2.

The fourth resistor R4 and the third Zener diode Zs3 form a clamping circuit, allowing the second switch transistor Q2 to conduct when a negative voltage pulse is applied to the input voltage bus VBB. The role of the third Zener diode Zs3 is to clamp the drain-gate voltage difference of the second switch transistor Q2 to a fixed voltage (such as 40V) when the drain voltage of the second switch transistor Q2 is significantly higher than the gate voltage of the second switch transistor Q2. At this time, the current flowing through the third Zener diode Zs3 generates a sufficiently large gate-source voltage across the fourth resistor R4 to cause the second switch transistor Q2 to conduct (turn on).

The resistance of the fifth resistor R5 may generally be configured to be the same as that of the fourth resistor R4. The function of the fifth resistor R5 is to provide some isolation between the gate of the second switch transistor Q2 and the output voltage of the low dropout regulator (LDO) 11. This isolation ensures that when the third Zener diode Zs3 is conducting in reverse, the gate-source voltage difference of the second switch transistor Q2 can be established through the fourth resistor R4, causing the second switch transistor Q2 to conduct. Conversely, if the fifth resistor R5 is not configured, the gate voltage of the second switch transistor Q2 would be maintained at a voltage higher than the voltage at the input voltage bus VBB by a forward voltage drop of the body diode of the switch transistor QA1 in the LDO 11, preventing the second switch transistor Q2 from conducting.

In this embodiment, the third circuit portion 30 comprises a sixth resistor R6. The sixth resistor R6 is connected between the cathode of the first diode D1 and the second ground SGND.

The resistance value of the sixth resistor R6 needs to be sufficiently large to reduce the transient current generated when the second switch transistor Q2 turns on in response to a negative voltage pulse. At the same time, the resistance value of the sixth resistor R6 needs to be sufficiently small so that during normal operation of the grounding system 100 (i.e., with the correct power supply polarity), the voltage drop across the sixth resistor R6 is much smaller than the forward conduction voltage drop of the first diode D1. Since the total current flowing through the resistor R6 during the normal operation is very small, the voltage drop across the sixth resistor (divider resistor) R6 remains significantly lower than the forward conduction voltage drop of the first diode D1. Thus, the voltage difference between the first ground CGND and the second ground SGND will not be large enough to adversely affect the function of the first circuit portion 10.

Specifically, in the circuit structure shown in FIG. 7, when a negative voltage pulse is applied to the input voltage bus VBB, the clamping action of the diode $D_{ISO}$ conducts the negative voltage to the first ground CGND, meaning that the negative voltage is conducted to the source of the second switch Q2. In this case, due to the clamping action of the third Zener diode Zs3, the voltage difference between the drain and gate of the second switch transistor Q2 is clamped to a fixed voltage (e.g., 40V in this example). The current flowing through the third Zener diode Zs3 creates a voltage drop across the fourth resistor R4, turning on the second switch Q2. When the second switch transistor Q2 is on, the gate-source voltage reaches just enough to allow sufficient current to flow through the second switch transistor Q2 so that the sum of the voltage drops across the sixth resistor R6, the clamping voltage of the third Zener diode Zs3, the gate-source voltage of the second switch transistor Q2, and the forward conduction voltage drop of the diode $D_{ISO}$ equals the voltage of the negative pulse applied. At this time, the voltage drop across the sixth resistor R6 is close to 110V as an example, indicating that the sixth resistor R6 bears most of the negative voltage pulse. This configuration ensures that the voltage ratings of the second switch transistor Q2 and the third Zener diode Zs3 only need to be 40V, allowing for the selection of lower voltage-rated components, which reduces costs while protecting the grounding system 100.

It should be noted that the strategies employed in the embodiments depicted in FIG. 3 and FIG. 7 are different when dealing with scenarios involving the application of negative voltage pulses to the input voltage bus VBB. The strategy used in the embodiment shown in FIG. 3 involves blocking transient currents, which requires higher voltage rated components, leading to increased costs and making it unsuitable for integration into integrated circuits. On the other hand, the strategy used in the embodiment shown in FIG. 7 involves bypassing transient currents to limit the voltage applied to the switch transistor in the built-in switch branch 21, thus protecting the grounding system 100. This approach requires lower voltage rating of the components, reduces costs, and is suitable for integration into integrated circuits, making it more practical.

Figure 8:
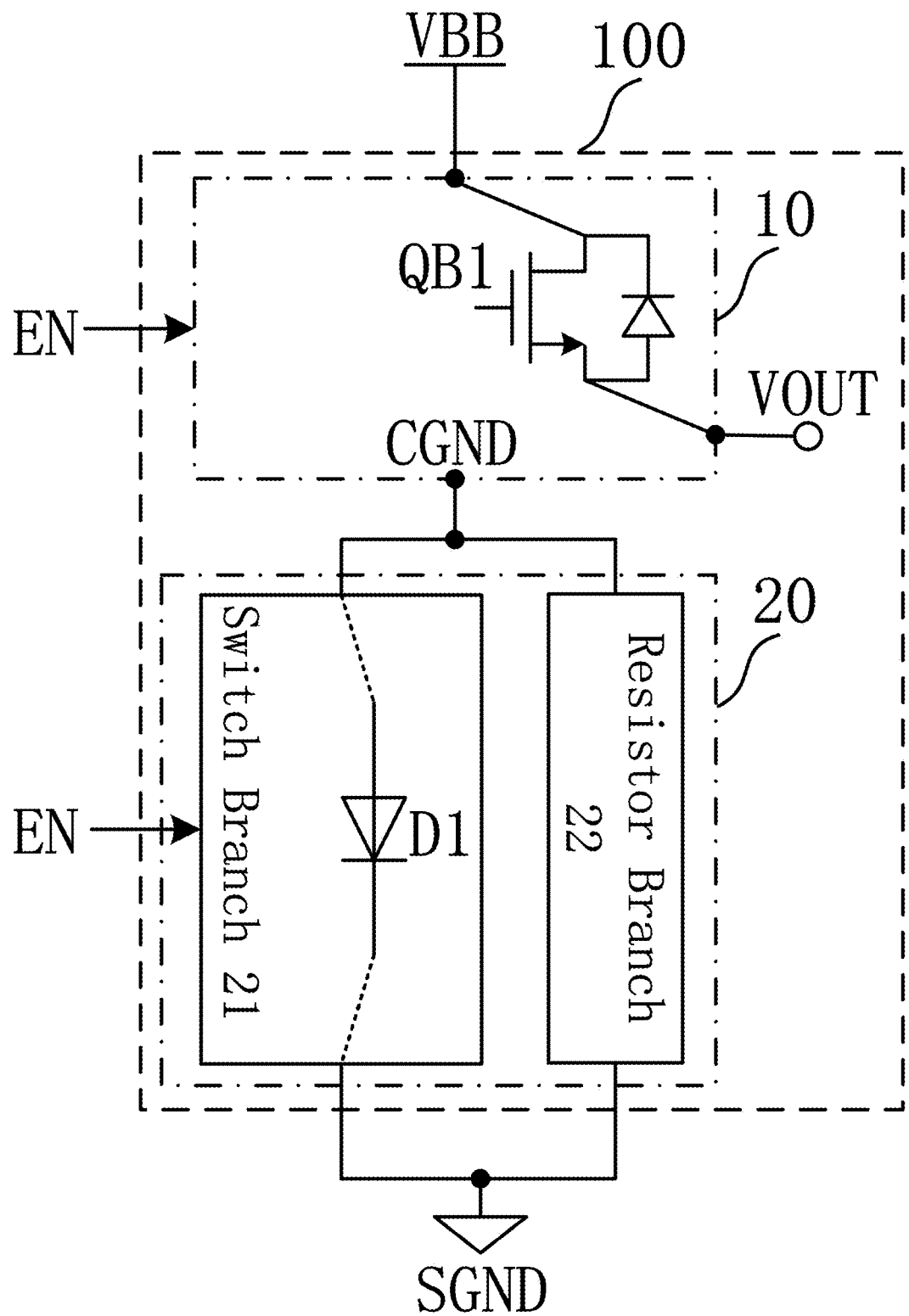
FIG. 8 is a schematic diagram of yet another grounding system provided in an embodiment of the present application.

Please refer to FIG. 8. FIG. 8 illustrates the structure of an example grounding system 100 where a third control method is used for the switch branch 21, according to embodiments of the present application. Specifically, as shown in FIG. 8, the first circuit portion 10 includes a high-side switch QB1, and the first circuit portion 10 is configured to receive an enable signal EN.

The high-side switch QB1 is connected between the input voltage bus VBB and a voltage output terminal VOUT of the grounding system 100. The high-side switch QB1 is configured to conduct in response to a first logic level of the enable signal EN. The first logic level can be either high or low.

The switch branch 21 is also configured to establish a first current path and short-circuit the first diode D1 in response to the first logic level. The switch branch 21 is further configured to disconnect the first current path and stop short-circuiting the first diode D1 in response to a second logic level of the enable signal EN. The first logic level and the second logic level are different from each other, where, for example, the first logic level is high when the second logic level is low. In the embodiments described in this application, the first logic level is consistently high, and the second logic level is consistently low.

Figure 9:
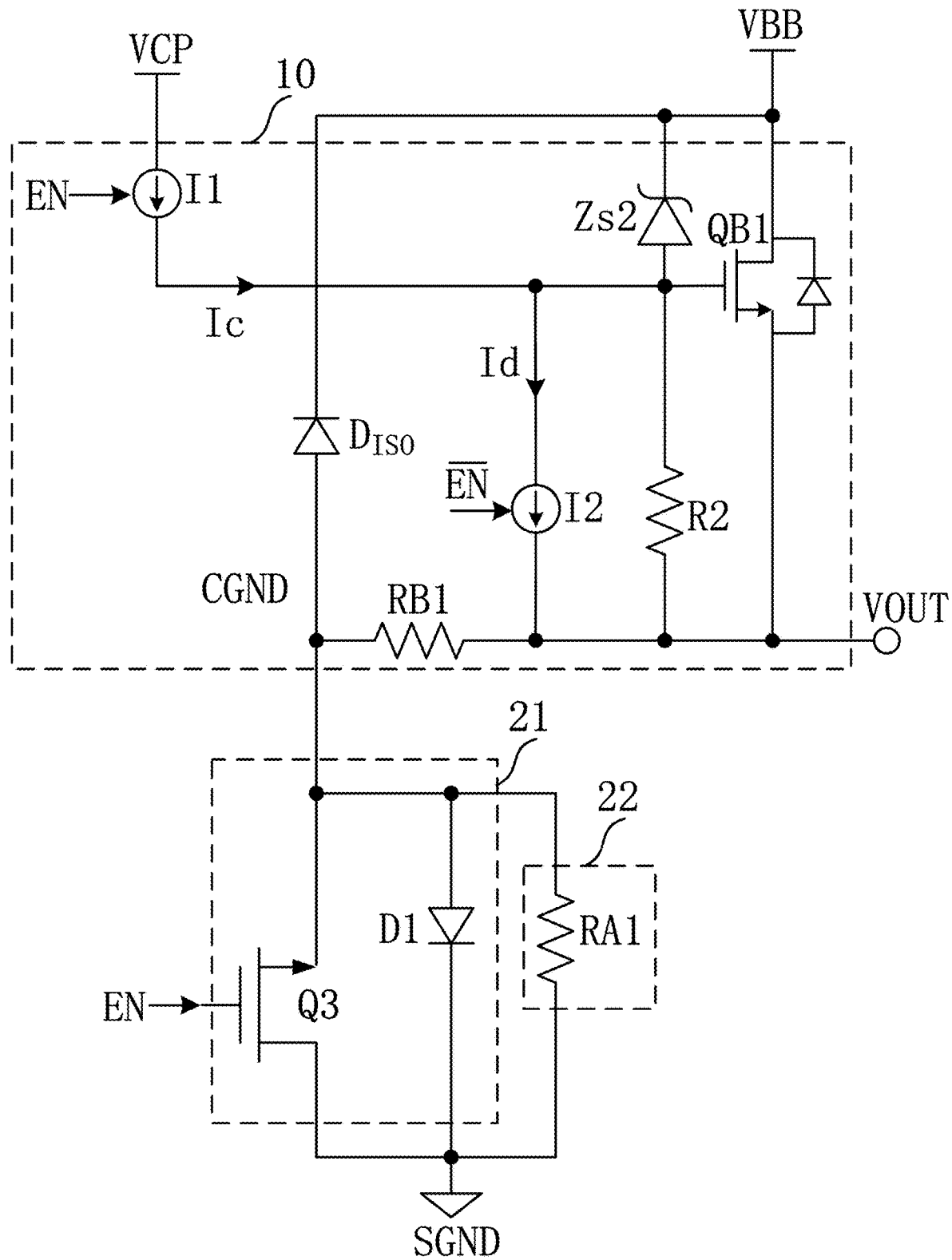
FIG. 9 is a schematic diagram of a circuit corresponding to the grounding system shown in FIG. 8.

Please refer to FIG. 9, which exemplifies a circuit structure corresponding to the grounding system 100 shown in FIG. 8. As shown in FIG. 9, the first circuit portion 10 further comprises a second Zener diode Zs2, a second resistor R2, a first current source I1, and a second current source I2.

The anode of the second Zener diode Zs2 and the positive terminal of the first current source I1, as well as the negative terminal of the second current source I2, are all connected to the gate of the high-side switch QB1. The positive terminal of the second current source I2 is connected to the voltage output terminal VOUT. The first current source I1 responds to the first logic level of the enable signal EN to charge the gate of the high-side switch QB1 with a current Ic, causing the high-side switch QB1 to turn on. The second current source I2 responds to an inverted signal EN of the enable signal EN, which has the first logic level (or it can respond to the second logic level of the enable signal), discharging the gate of the high-side switch QB1 with a current Id to turn the high-side switch QB1 off. The cathode of the second Zener diode Zs2 is connected to the input voltage bus VBB. The second resistor R2 is connected between the gate of the high-side switch QB1 and the voltage output terminal VOUT. The negative terminal of the current source I1 is connected to a bias voltage VCP. The bias voltage VCP is generated by a bootstrap circuit from the voltage of the input voltage bus VBB, and is maintained at a voltage higher than the voltage of the input voltage bus VBB.

In this embodiment, the switch branch 21 comprises a third switch transistor Q3, with the first diode D1 representing the body diode of the third switch transistor Q3.

The third switch transistor Q3 is configured to conduct in response to the first logic level of the enable signal EN, establishing the first current path and short-circuiting the first diode D1. The third switch transistor Q3 is also configured to turn off in response to the second logic level of the enable signal EN, disconnecting the first current path and ceasing short-circuiting the first diode D1.

Additionally, in this embodiment, a resistor RB1 represents a parasitic resistance between the first ground CGND and the voltage output terminal VOUT. The diode $D_{ISO}$ is the parasitic diode between the input voltage bus VBB and the first ground CGND.

Also, in this embodiment, the resistor branch 22 including a resistor RA1 is used as an example. The resistor RA1 is primarily used to limit the reverse current, and its value needs to be sufficiently large to effectively limit the reverse current. In applications where a load connected to the voltage output terminal VOUT is an inductive load, and when the high-side switch QB1 is turned off, the voltage at the voltage output terminal VOUT may rapidly drop to a negative voltage until the clamping circuit Zs2 clamps the voltage at the voltage output terminal VOUT (such as clamping to around −40V). In this case, the resistance value of the resistor RB1 may need to be small enough so that the voltage at the first ground CGND, obtained through the voltage division of the resistors RA1 and RB1, is not low enough to cause a logic state change in logic circuits in a digital circuitry. For example, in a 3.3V logic circuit, the potential drop of the first ground CGND caused by the disconnection of the inductive load may be much smaller than 1.6V, thus avoiding inadvertent triggering of logic state changes in control signals of the digital circuitry.

Specifically, when the grounding system 100 in FIG. 9 is operating normally (i.e., with the power supply's polarity correctly connected), the enable signal EN may be configured as a high logic level and applied to the gate of the third switch transistor Q3 to turn on the third switch transistor Q3. In this case, on one hand, due to the conduction of the third switch transistor Q3, the first diode D1 is shorted. On the other hand, because the conduction resistance of the third switch transistor Q3 is very small and the current flowing through it is not large, the voltage drop generated across the third switch transistor Q3 is much smaller than the forward conduction voltage drop of the first diode D1. As a result, there is no significant voltage difference between the first ground CGND and the second ground SGND, thereby preventing adverse effects on the functionality of the first circuit portion 10.

When the grounding system 100 in FIG. 9 is operating with the power supply polarity reversed, the second ground SGND is connected to the positive terminal of the power supply, and the input voltage bus VBB is connected to the negative terminal of the power supply. In this case, the enable signal EN may be set to a low logic level and applied to the gate of the third switch transistor Q3 to turn off the third switch transistor Q3. The body diode of the third switch transistor Q3 (i.e., the first diode D1) then blocks the reverse voltage.

It is understood that the structure of the first circuit portion 10 shown in FIG. 9 can be applied to any of the embodiments shown in FIGS. 1 through 8.

Furthermore, it can also be understood that if the first diode D1 is not shorted during the normal operation of the grounding system 100, the forward conduction voltage drop across the first diode D1 would adversely affect the functionality of the first circuit portion 10. For example, in scenarios where there is a short circuit between the voltage output terminal VOUT and the second ground SGND, which requires the high-side switch QB1 to be in a current-limiting state, the forward voltage drop of the first diode D1 may negatively impact the functionality of the first circuit portion 10. This will be explained further with the example shown in FIG. 10.

Figure 10:
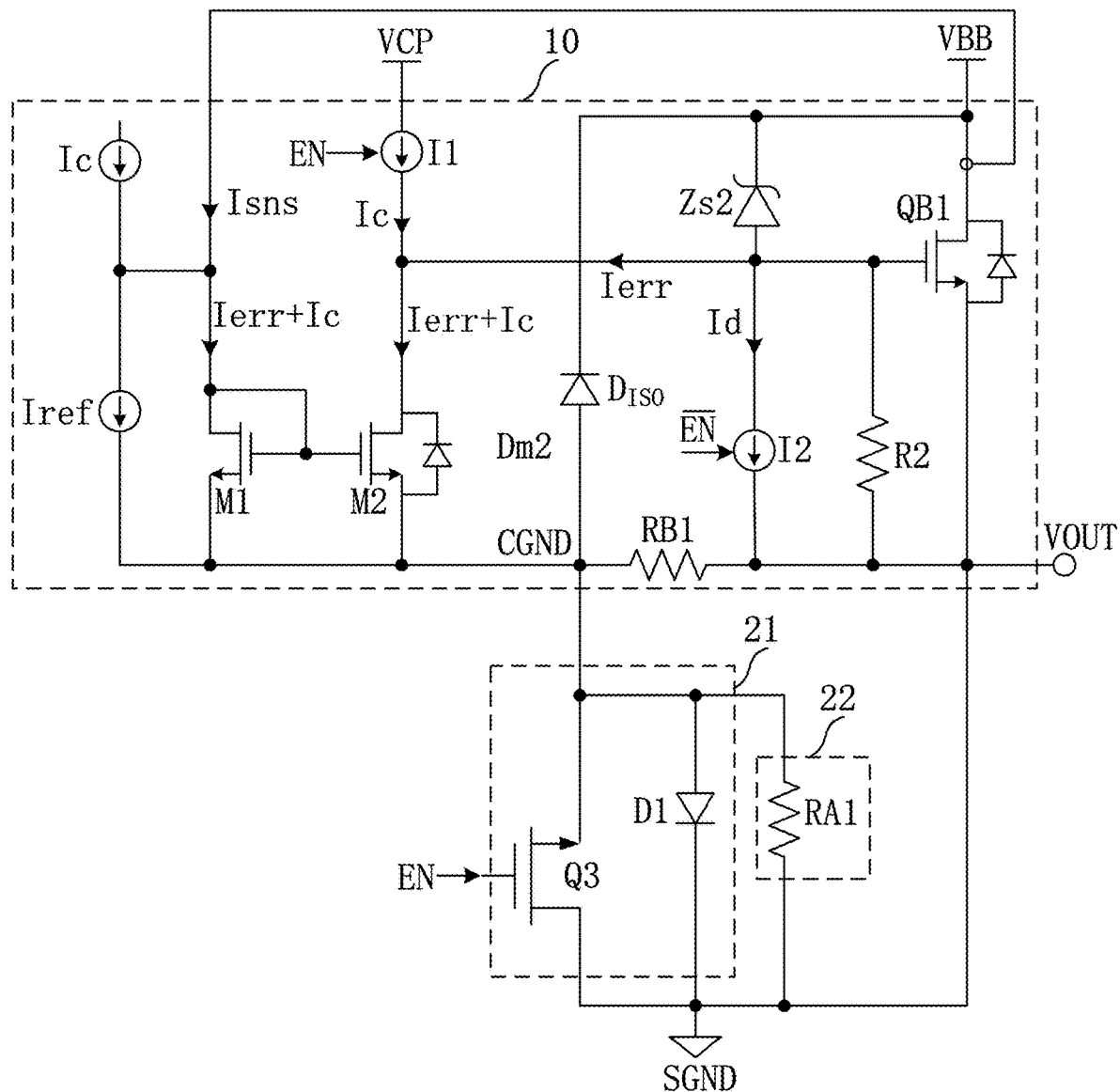
FIG. 10 is a schematic diagram of another circuit corresponding to the grounding system shown in FIG. 8.

As shown in FIG. 10, the first circuit portion 10 may also include a first transistor M1 and a second transistor M2. Here, for example, the width-to-length ratio of the first transistor M1 and the second transistor M2 is assumed to be the same, resulting in a current mirror configuration with a ratio of 1:1 formed by the first transistor M1 and the second transistor M2.

The drain of the first transistor M1 receives the charging current Ic and an error current Ierr. The charging current Ic is equal to the output current of the first current source I1, and the error current Ierr is the difference between the current flowing through the high-side switch QB1 (Isns) and a preset reference current (Iref). The current Isns is the current flowing through the high-side switch QB1 detected using current sensing techniques such as a current sensor. The preset reference current Iref is a predetermined target current representing the current flowing through QB1 when QB1 is in a current limiting state. The drain of the first transistor M1 is connected to the gate of the first transistor M1 and the gate of the second transistor M2. The source of the first transistor M1 and the source of the second transistor M2 are both connected to the first ground CGND. The drain of the second transistor M2 is connected to the gate of the high-side switch QB1.

In this embodiment of FIG. 10, the current flowing through the high-side switch QB1 (Isns) is detected and compared with the preset reference current (Iref) to obtain the error current (Ierr). After the error current Ierr is combined with the charging current Ic, the combined current passes through a 1:1 current mirror composed of the first transistor M1 and the second transistor M2, mirroring to the gate of the high-side switch QB1. The difference between the mirrored current and the current output by the first current source I1 is exactly the error current Ierr. The gate of the high-side switch QB1 is then pulled down in order to adjust the on-resistance of QB1 until the gate-source voltage difference of the high-side switch QB1 is at a value such that the current Isns flowing through QB1 equals to the preset reference current Iref, achieving the current limiting purpose.

However, the smaller the current limiting value (e.g., less than 1A, corresponding to smaller preset reference current Iref), the smaller the corresponding gate-source voltage difference of the high-side switch QB1. In practical applications, it is often necessary for the gate-source voltage difference of the high-side switch QB1 to be less than 1V. If the first diode D1 is not shorted, there is already an inherent voltage drop of 0.7V (assuming the forward conduction voltage drop of the first diode D1 is 0.7V as an example) between the first ground CGND and the second ground SGND. In this case, accurately controlling the gate-source voltage difference of the high-side switch QB1 to be at a voltage value below 1V becomes very difficult (especially since the first transistor M1 and the second transistor M2 are connected to the second ground CGND), thereby adversely affecting the current limiting function of the first circuit portion 10. In other words, in the embodiments of the present application, shorting the first diode D1 when the grounding system 100 is operating normally prevents adverse effects on the functionality of the first circuit portion 10. In practical applications, the widths-to-lengths ratio of the first transistor M1 and the second transistor M2 can be adjusted according to specific needs, and the charging current Ic and the reference current Iref need to be adjusted accordingly. These operations are familiar to those ordinarily skilled in the art and are not further elaborated here.

Figure 11:
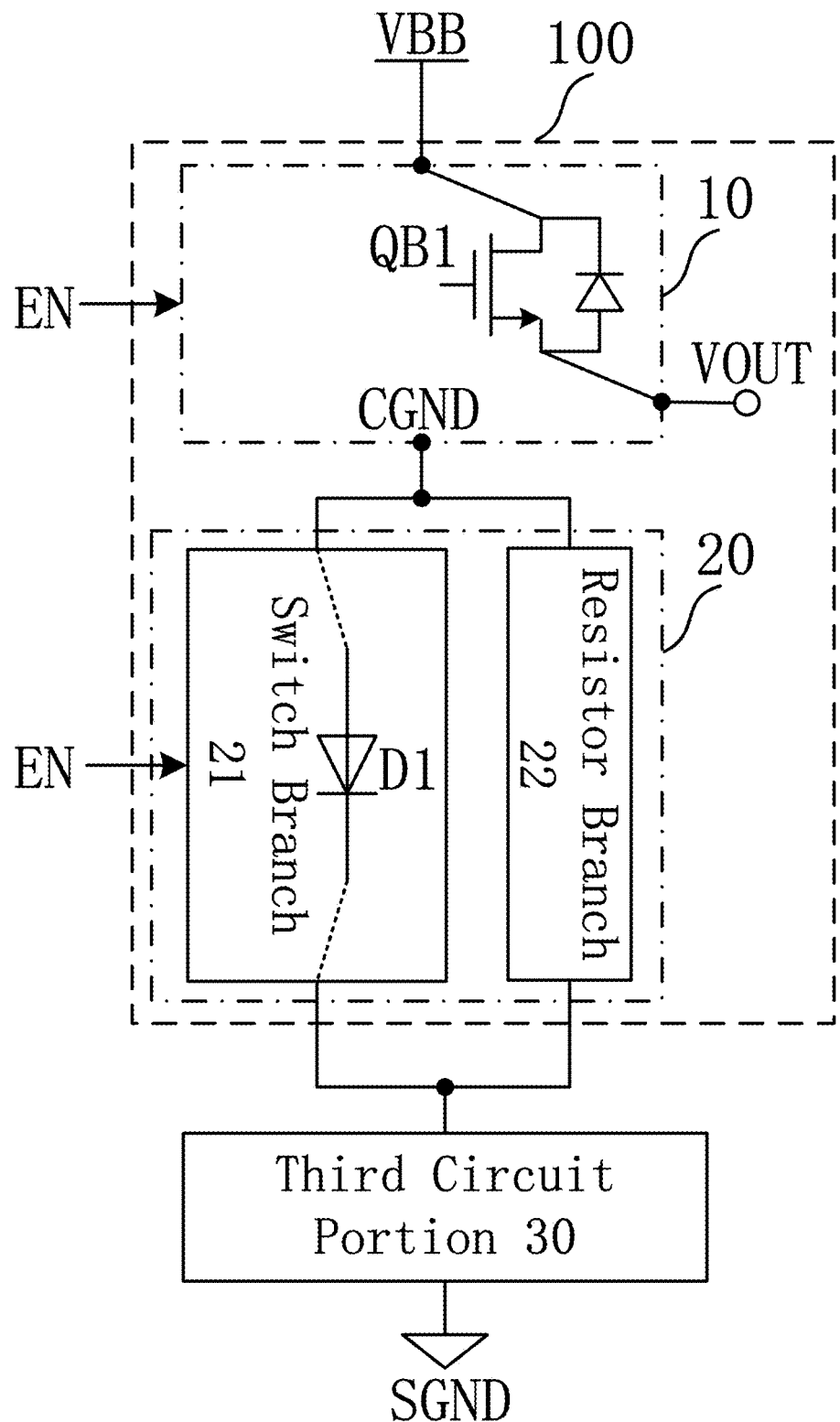
FIG. 11 is a schematic diagram of yet another grounding system provided in an embodiment of the present application.

Please refer to FIG. 11, which illustrates an grounding system 100 with a third circuit portion 30 added on the basis of FIG. 8 to achieve protection for the entire grounding system 100 when a negative voltage pulse is applied to the input voltage bus VBB.

As shown in FIG. 11, the ground system 100 further includes the third circuit portion 30. The third circuit portion 30 is connected between the second circuit portion 20 and the second ground SGND. The third circuit portion 30 is used to generate a voltage drop to reduce the voltage across the first diode D1. Additionally, in this embodiment, the switch path 21 is configured to establish a second current path between the second ground SGND and the first ground CGND and to short-circuit the first diode D1 when a negative voltage pulse is applied to the input voltage bus VBB. The second current path refers to a path through which current flows from the second ground SGND to the first ground CGND.

In this embodiment, when a negative voltage pulse is applied to the input voltage bus VBB, the second current path is established to allow current to flow from the second ground SGND to the input voltage bus VBB. However, due to the presence of the third circuit portion 30, the third circuit portion 30 can withstand most of the negative voltage pulse's voltage. This configuration ensures that the voltage the switch path 21 needs to withstand remains relatively low. Consequently, components with lower voltage ratings can be selected, which reduces costs while still protecting the grounding system 100.

Figure 12:
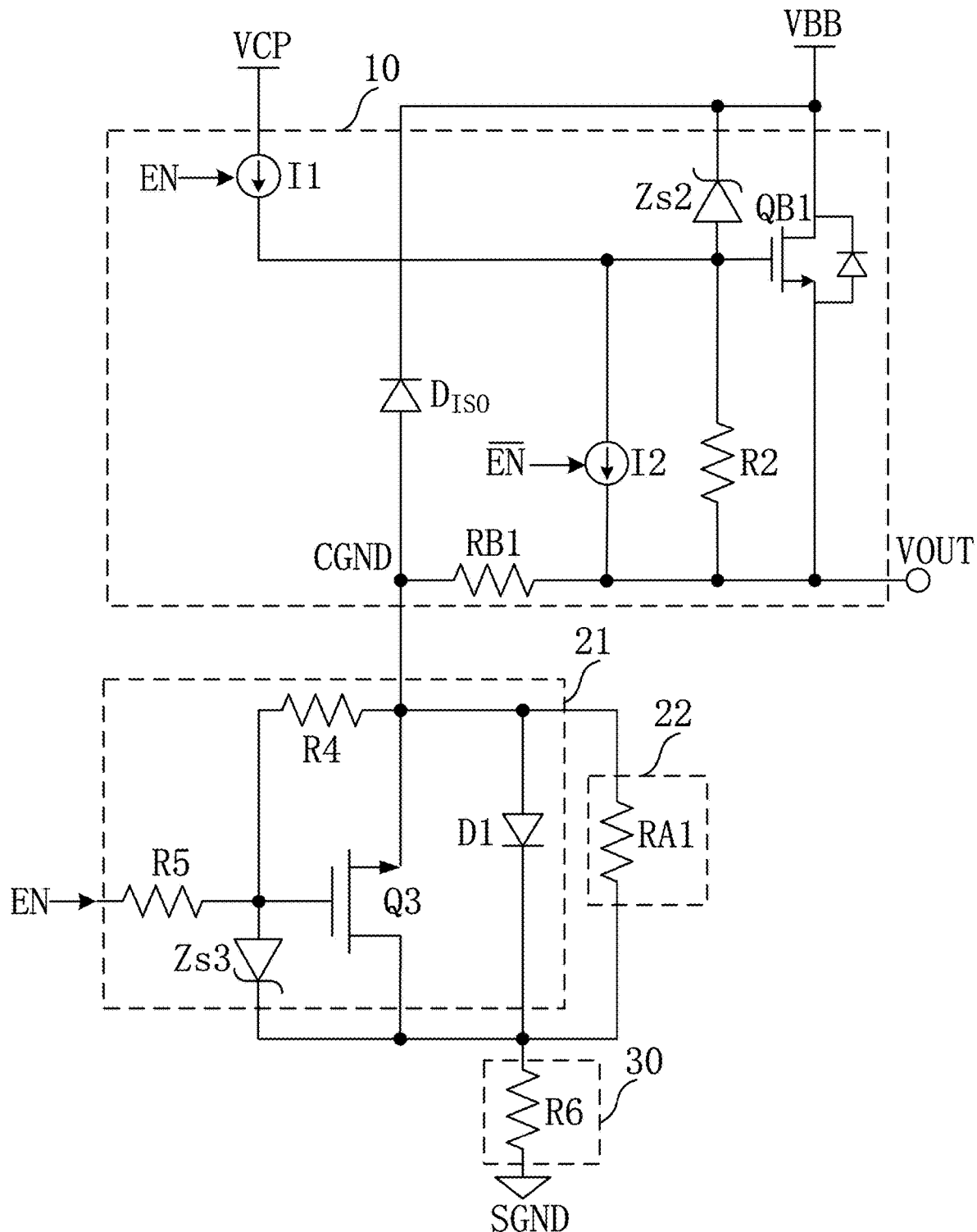
FIG. 12 is a schematic diagram of a circuit corresponding to the grounding system shown in FIG. 11.

Please refer to FIG. 12. FIG. 12 exemplarily shows a circuit structure corresponding to FIG. 11. As shown in FIG. 12, the switch branch 21 also includes a fourth resistor R4, a fifth resistor R5, and a third Zener diode Zs3.

The fourth resistor R4 is connected between the gate and the source of a switch transistor (i.e., the third switch transistor Q3) in the switch branch 21. The anode of the third Zener diode Zs3 is connected to the gate of the third switch transistor Q3. The cathode of the third Zener diode Zs3 is connected to the drain of the third switch transistor Q3. The first terminal of the fifth resistor R5 receives the enable signal EN.

The fourth resistor R4 and the third Zener diode Zs3 form a clamping circuit to enable the third switch transistor Q3 to turn on when a negative voltage pulse is applied to the input voltage bus VBB. The function of the third Zener diode Zs3 is to clamp the drain-to-gate voltage difference of the third switch transistor Q3 to a fixed voltage (e.g., 40V) when the drain voltage of Q3 is significantly higher than its gate voltage. The current flowing through the third Zener diode Zs3 then generates a sufficient gate-source voltage across the fourth resistor R4 to turn on the third switch transistor Q3.

The resistance value of the fifth resistor R5 is generally configured to be the same as that of the fourth resistor R4. The fifth resistor R5 serves as an isolating component, allowing the gate-source voltage difference of the third switch transistor Q3 to be established through the fourth resistor R4 when the third Zener diode Zs3 conducts in reverse, thereby turning on the third switch transistor Q3.

In this embodiment, the third circuit portion 30 includes a sixth resistor R6. The sixth resistor R6 is connected between the cathode of the first diode D1 and the second ground SGND.

The resistance value of the sixth resistor R6 chosen needs to be large enough to reduce the transient current generated when the third switch transistor Q3 turns on in response to a negative voltage pulse. At the same time, the resistance value of the sixth resistor R6 needs also to be small enough so that, in the circuit shown in FIG. 7, during normal operation (i.e., with the correct polarity of the power supply), the voltage drop across the sixth resistor R6 is much less than the forward conduction voltage drop of the first diode D1. Since the total current flowing through the sixth resistor R6 during normal operation is very small, the voltage drop across the voltage divider resistor R6 remains well below the forward conduction voltage drop of the first diode D1. As a result, the voltage difference between the first ground CGND and the second ground SGND will not be large enough to adversely affect the function of the first circuit portion 10.

Specifically, in the circuit structure shown in FIG. 12, when a negative voltage pulse is applied to the input voltage bus VBB, the clamping action of the diode $D_{ISO}$ conducts the negative voltage to the first ground CGND, which means that the negative voltage is applied to the source of the third switch transistor Q3. At this time, due to the clamping action of the third Zener diode Zs3, the drain-to-gate voltage difference of the third switch transistor Q3 is clamped to a fixed voltage (40V in this example). The current flowing through the third Zener diode Zs3 creates a voltage drop across the fourth resistor R4, turning on the third switch transistor Q3. When the third switch transistor Q3 is turned on, the gate-source voltage will reach a level sufficient to allow enough current to flow through the third switch transistor Q3 so that the sum of the voltage drops across the sixth resistor R6, the clamping voltage of the third Zener diode Zs3, the gate-source voltage of the third switch transistor Q3, and the forward conduction voltage drop of the diode $D_{ISO}$ equals the voltage of the negative pulse applied. At this time, the voltage drop across the sixth resistor R6 is close to 110V, indicating that the sixth resistor R6 bears most of the negative voltage pulse. This configuration allows the third switch transistor Q3 and the third Zener diode Zs3 to have a voltage rating of only 40V, thus enabling the use of components with lower voltage ratings, which reduces costs while protecting the grounding system 100.

It should be noted that for the application scenarios where a negative voltage pulse is applied to the input voltage bus VBB, the protection strategy of the embodiment shown in FIG. 12 is the same as that of the embodiment shown in FIG. 7. For details, please refer to the description for FIG. 7, which will not be repeated here.

Figure 13:
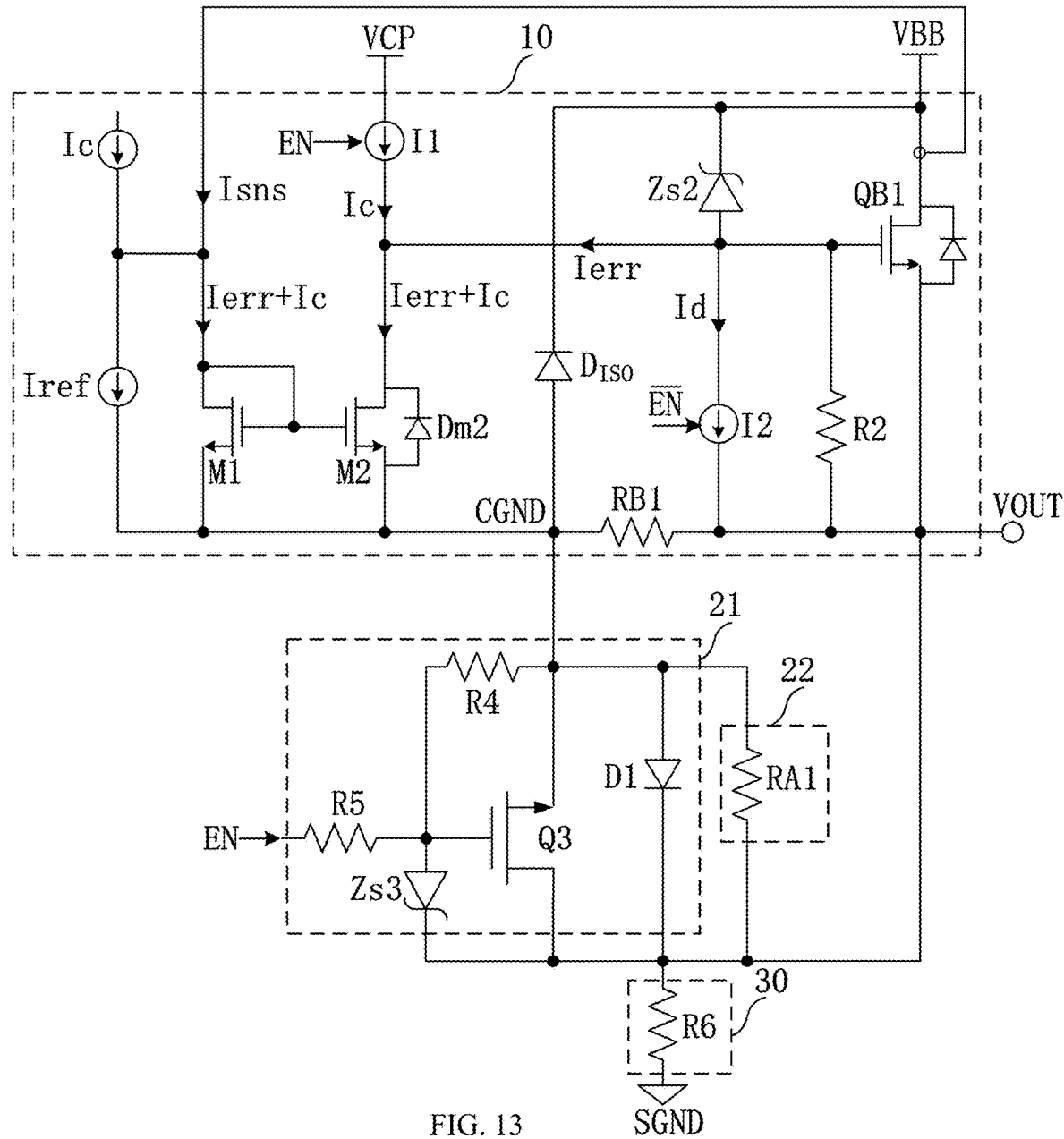
FIG. 13 is a schematic diagram of another circuit corresponding to the grounding system shown in FIG. 11.

Meanwhile, similar to the structure shown in FIG. 10, the structure shown in FIG. 12 can be applied to scenarios where the voltage output terminal VOUT is shorted to the second ground SGND, requiring the high-side switch QB1 to be in a current-limiting state, as specifically shown in FIG. 13. In FIG. 13, the fourth resistor R4, fifth resistor R5, sixth resistor R6, and third Zener diode Zs3 are added based on the structure shown in FIG. 10. For detailed implementation process of the structure shown in FIG. 13, reference can be made to the descriptions for FIGS. 10 and 12, which will not be repeated here.

Additionally, in the embodiments shown in FIGS. 9, 10, 12, and 13, by using the enable signal EN that controls the high-side switch QB1 as the gate control signal for the third switch transistor Q3, it is possible to further enhance the protection against negative voltages when the voltage output terminal VOUT is connected to an inductive load and the high-side switch QB1 is turned off. Specifically, when the EN signal is set to a low level, the high-side switch QB1 is turned off, thereby simultaneously turning off the third switch transistor Q3. In this way, in scenarios where the voltage output terminal VOUT is connected to an inductive load, and when the high-side switch QB1 is turned off and the inductive load current pulls the voltage at the voltage output terminal VOUT down to a negative voltage, the voltage of the first ground CGND can be controlled through the voltage division of the resistors RA1 and RB1 (i.e., the value chosen for resistor RA1). This ensures that the second ground SGND is not pulled too low, which could otherwise cause the high-side switch QB1 to be erroneously re-enabled.

However, when the voltage output terminal VOUT is connected to an inductive load and the high-side switch QB1 is controlled to turn off, the voltage at the voltage output terminal VOUT will rapidly decrease to a negative voltage. Due to the presence of the body diode Dm2 of the second transistor M2, the voltage at the gate of the high-side switch QB1 will be clamped to the first ground CGND minus the voltage drop of a diode, such as −0.7V. This causes the voltage at the voltage output terminal VOUT to drop to a certain negative voltage level where the high-side switch QB1 can no longer remain turned off. Consequently, the high-side switch QB1 may re-enable. The re-enabling of the high-side switch QB1 not only leads to additional losses but also results in a prolonged time for the release of stored energy on the inductive load, which is undesirable in practical applications.

Based on this, in the present application embodiment, a second diode D2 is further provided to block the reverse current from the first ground CGND to the gate of the high-side switch QB1, ensuring that the high-side switch QB1 can be properly turned off when connected to an inductive load and that energy dissipation can be completed in a shorter time. At the same time, bypassing the newly added diode should be implemented to prevent its forward conduction voltage drop from affecting the functionality of the first circuit portion 10 (such as the accuracy of the high-side switch QB1 when operating in current limiting mode).

Figure 14:
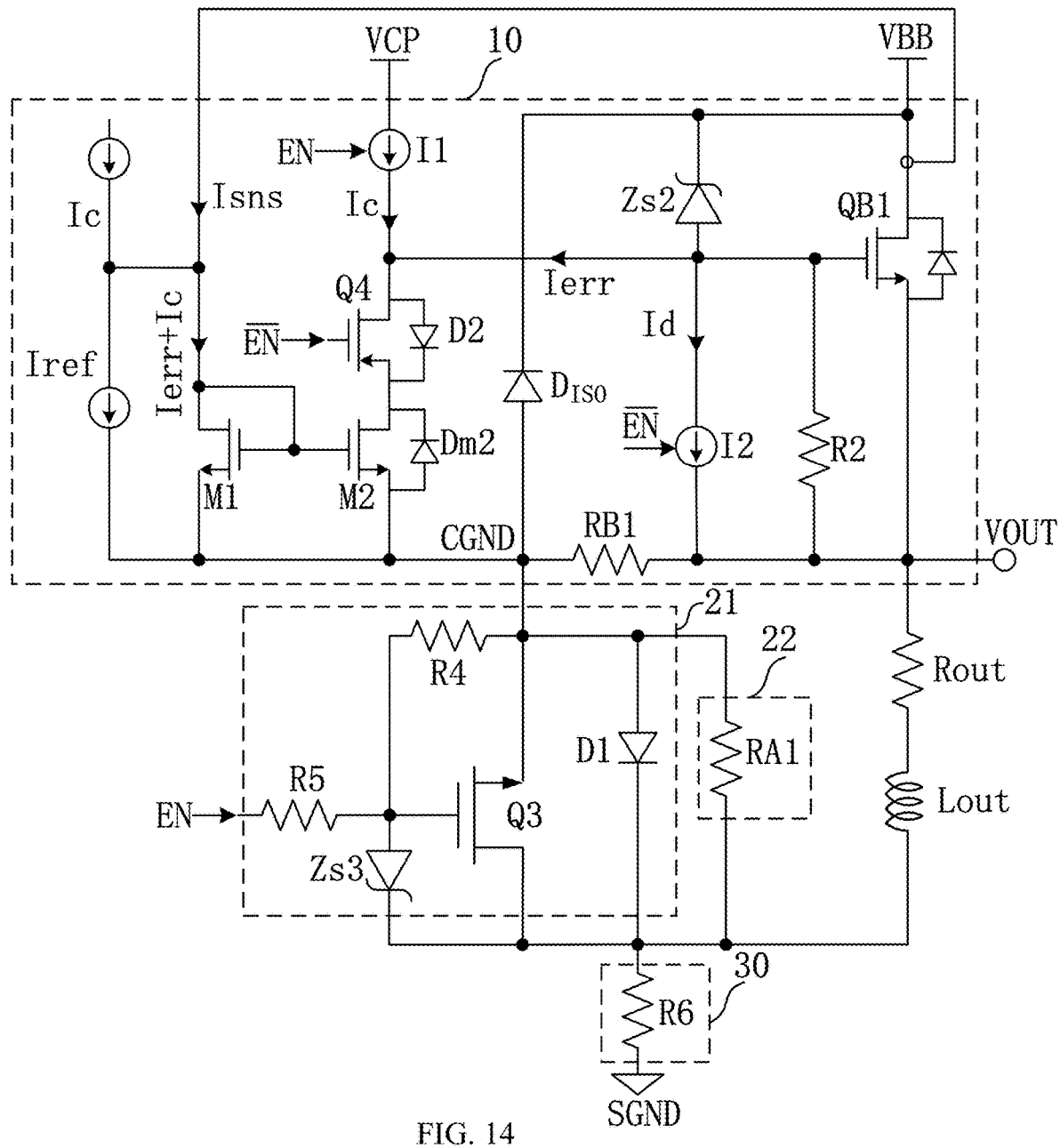
FIG. 14 is a schematic diagram of yet another circuit corresponding to the grounding system shown in FIG. 11.

Please refer to FIG. 14, which exemplifies a structure built upon the one shown in FIG. 13, by adding a fourth switch transistor Q4. This addition aims to block the reverse current from the first ground CGND to the gate of the high-side switch QB1 while avoiding the impact of the forward conduction voltage drop of the newly added second diode D2 on the functionality of the first circuit portion 10. Additionally, this embodiment takes the example where the voltage output terminal VOUT is connected to an inductive load (where the inductive load is equivalent to a resistor $R_{OUT}$ and an inductor $L_{OUT}$ connected in series).

As shown in FIG. 14, the fourth switch transistor Q4 is connected in series between the second transistor M2 and the gate of the high-side switch QB1. In some embodiments, the second diode D2 may be the body diode of the fourth switch transistor Q4. The cathode of the second diode D2 is connected to the second transistor M2, and the anode is connected to the gate of the high-side switch QB1. The fourth switch transistor Q4 is configured to conduct when the enable signal EN is at the first logic level and is configured to turn off when the enable signal EN is at the second logic level. It can be understood that, in this embodiment, the first logic level is the high logic level, and the second logic level is the low logic level, for example.

In this embodiment, taking a P-type MOS transistor as an example, the gate control signal of the fourth switch transistor Q4 is in the inverse of the enable signal EN. That is, when the high-side switch QB1 is controlled to conduct (enable signal EN is at the logic high level), the control signal of the fourth switch transistor Q4 is at the logic low level, causing the fourth switch transistor Q4 to conduct and bypass the second diode D2. Consequently, when current limiting is required, it does not occupy the control space of the gate-source voltage of the high-side switch QB1.

When it is necessary to control the high-side switch QB1 to turn off, the control signal of the fourth switch transistor Q4 (EN) is at the logic high level, causing the fourth switch transistor Q4 to turn off. The body diode of the fourth switch transistor, namely the second diode D2, prevents the current from flowing from the first ground CGND to the high-side switch QB1. This allows the gate voltage of the high-side switch QB1 to decrease along with the voltage drop at the voltage output terminal VOUT until it is clamped by the second Zener diode Zs2. At this point, the voltage at the gate of the high-side switch QB1 is specifically the voltage at the input voltage bus VBB minus the Zener breakdown voltage of the second Zener diode Zs2. For example, when the voltage at the input voltage bus VBB is 12V and the Zener breakdown voltage of the second Zener diode Zs2 is 40V, the gate voltage of the high-side switch QB1 can decrease to −28V. Consequently, the high-side switch QB1 will not conduct again, facilitating the energy dissipation on the inductive load to be completed in a shorter time.

Furthermore, in other embodiments, signals of other levels may also be used as the control signal of the fourth switch transistor Q4, if they can be used to control the fourth switch transistor Q4 to conduct when the high-side switch QB1 responds to the enable signal EN and turns on. Further, the fourth switch transistor Q4 may also be implemented using NMOS, which is within the understanding of those ordinarily skilled in the art, and therefore, is not elaborated further here. Moreover, the fourth switch transistor Q4 may be added in any of the embodiments of this application, in order to prevent occurrence of the abnormal situation where the high-side switch QB1 automatically turns on again after it is controlled to turn off when the load is an inductive load.

It should be noted that in various embodiments of this application, the circuit structures of the first circuit portion 10 provided by different embodiments can be interchanged or combined with each other, and the circuit structures of the second circuit portion 20 provided by different embodiments can also be interchanged or combined with each other.

Figure 15:
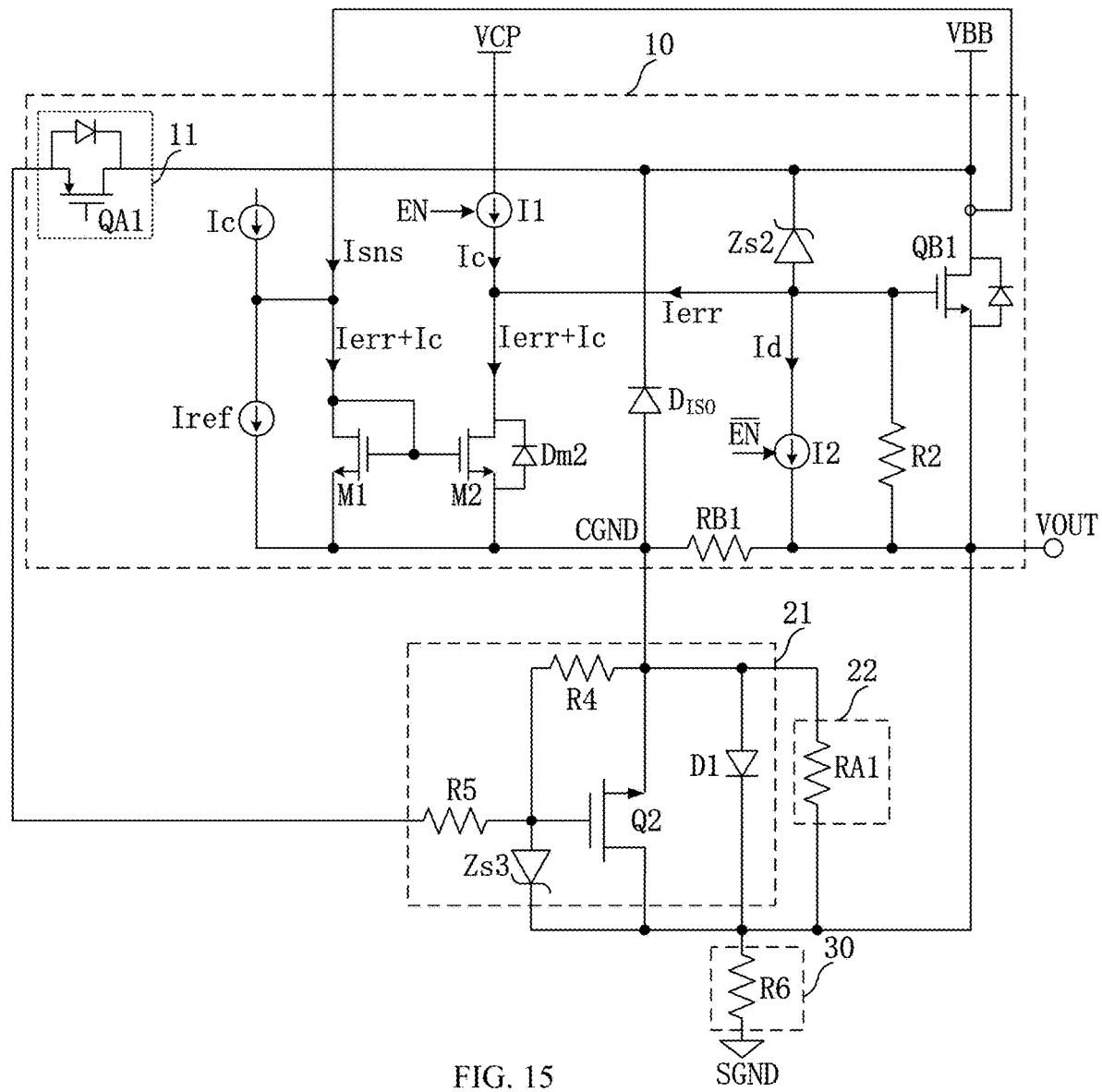
FIG. 15 is a schematic diagram of another circuit corresponding to the grounding system shown in FIG. 6.

For instance, in one embodiment, the first circuit portion 10 shown in FIG. 13 can be applied to the circuit structure shown in FIG. 7, as illustrated in FIG. 15. In this case, the first terminal of the fifth resistor R5 may be connected to the low dropout linear regulator 11 or may receive the enable signal EN as input. In this embodiment, the first terminal of the fifth resistor R5 is connected to the low dropout linear regulator 11, as an example.

Figure 16:
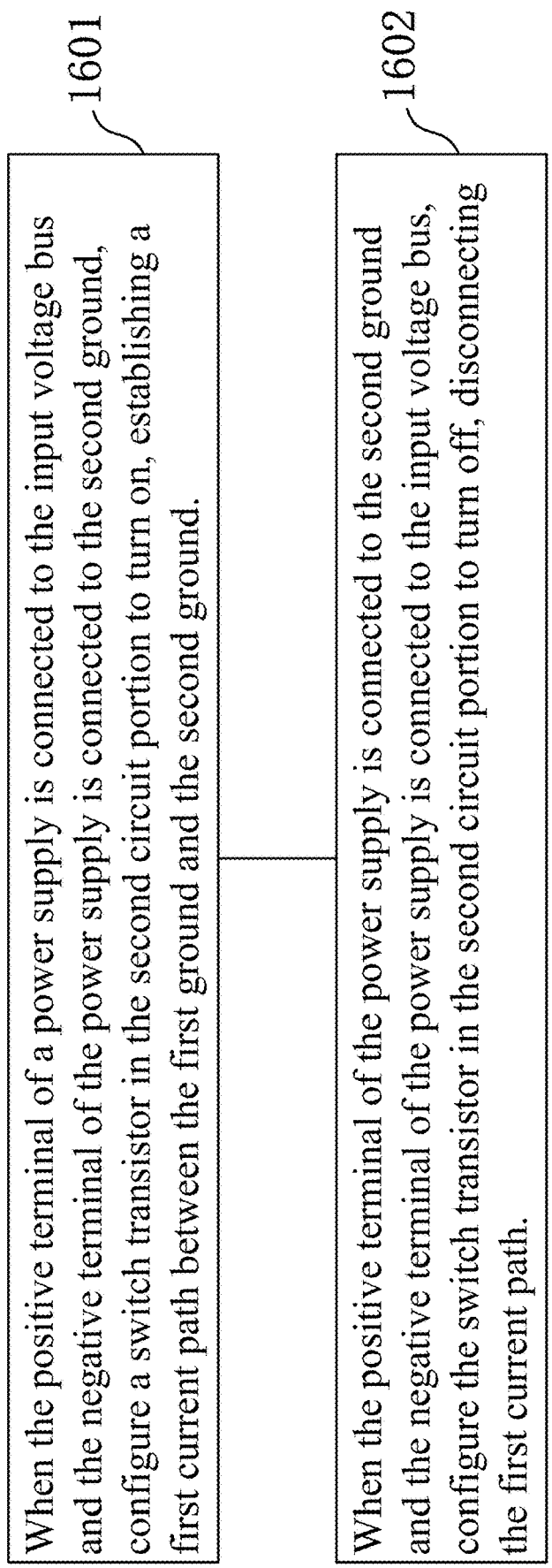
FIG. 16 is a flowchart of a control method based on a grounding system provided in an embodiment of the present application.

Please refer to FIG. 16. FIG. 16 is a flowchart illustrating a control method based on a grounding system provided in the embodiments of the present application. The grounding system includes a first circuit portion connected between an input voltage bus and a first ground, and a second circuit portion connected between the first ground and a second ground. In some embodiments, the structure of the grounding system can be implemented through any of the embodiments shown in FIGS. 1 through 15. As shown in FIG. 16, the control method comprises the following steps:

Step 1601: When the positive terminal of a power supply is connected to the input voltage bus and the negative terminal of the power supply is connected to the second ground, configure a switch transistor in the second circuit portion to conduct, thereby establishing a first current path between the first ground and the second ground.

Step 1602: When the positive terminal of the power supply is connected to the second ground and the negative terminal of the power supply is connected to the input voltage bus, configure the switch transistor in the second circuit portion to turn off, thereby disconnecting the first current path.

In one embodiment, the control method further includes the following step: when a negative voltage pulse is applied to the input voltage bus, configure the switch transistor in the second circuit portion to turn off.

In one embodiment, the control method further comprises the following step: when a negative voltage pulse is applied to the input voltage bus, configure the switch transistor in the second circuit portion to turn on in response to the negative voltage pulse, thereby establishing a second current path between the second ground and the first ground, and generating a voltage drop through a third circuit portion to reduce the voltage across a body diode of the switch transistor in the second circuit portion.

In one embodiment, the control method further comprises the following steps: in response to a first logic level in an enable signal, configure a high-side switch to conduct and configure a fourth switch transistor to turn on. In response to a second logic level in the enable signal, configure the high-side switch to turn off and configure the fourth switch transistor to turn off.

It should be understood that the specific control of the grounding system and the beneficial effects generated in the method embodiments can be referred to in the respective descriptions of the grounding system embodiments above. To be concise, it is not reiterated here.

Embodiments of this application also provide an integrated circuit comprising the first circuit portion 10 and the second circuit portion 20 as shown in any of FIGS. 1 and 4-15. Among them, the devices in the first circuit portion 10 and the second circuit portion 20 shown in FIGS. 4-15 need to withstand relatively low voltages, and thus devices with lower voltage ratings can be used, making them suitable for integration into a single integrated circuit die.

In practical applications, this integrated circuit can be combined with the third circuit portion 30 as shown in any of FIGS. 6, 7, 12, 13, and 14 to ensure the normal operation of the integrated circuit.

Figure 17:
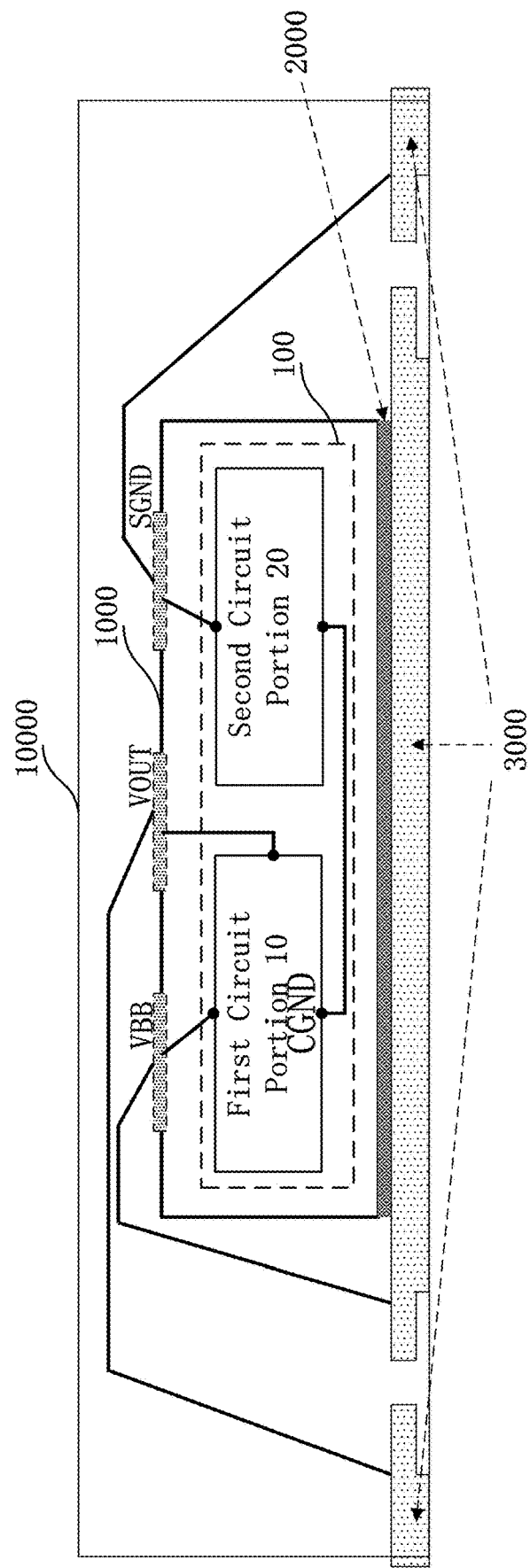
FIG. 17 is a schematic diagram of an integrated circuit package provided in an embodiment of the present application.

Please refer to FIG. 17, which illustrates a schematic structural diagram of an integrated circuit package 10000 provided in an embodiment of this application. As shown in FIG. 17, the integrated circuit package 10000 comprises a lead frame 3000, an adhesive 2000, and an integrated circuit die 1000 from any embodiment provided in this application. For example, the integrated circuit die 1000 may include the first circuit portion 10 and the second circuit portion 20 as shown in any of FIGS. 4-15.

The adhesive 2000 is located between the lead frame 3000 and the integrated circuit die 1000. The adhesive 2000 is used to bond the lead frame 3000 to the integrated circuit die 1000 and is configured to be thermally conductive and electrically non-conductive.

Specifically, each input and output of the integrated circuit die 1000 is connected to the pins on the lead frame 3000 through wire bonding. The pins on the lead frame 3000, located below the integrated circuit die 1000, comprise the voltage input bus VBB pin, which also serves as part of the integrated circuit's heat sink. Since the substrate of the lateral transistor structure corresponds to the integrated circuit ground potential of the integrated circuit die 1000, i.e., it corresponds to the first ground CGND in the above embodiments, during die bonding, the integrated circuit die 1000 cannot be directly connected to the voltage input bus VBB pin directly beneath the integrated circuit die 1000. Instead, the thermally conductive and electrically non-conductive adhesive 2000 is used to bond the integrated circuit die 1000 to the lead frame 3000. This ensures insulation between the second ground SGND and the voltage input bus VBB pin while maintaining good thermal conductivity between the integrated circuit die 1000 and the lead frame 3000 for effective heat dissipation.

In this embodiment, one terminal of the second circuit portion 20 is connected to the substrate of the integrated circuit die 1000, and the other terminal is connected to the SGND bonding pad on the integrated circuit die 1000 and then linked through bond wires to the second ground SGND pin on the lead frame 3000. In this packaging method, the first ground CGND is concealed within the integrated circuit package and is not exposed to systems outside the integrated circuit die 1000.

In traditional packaging structures, during the die bonding process, a thermally and electrically conductive adhesive is often used to bond the integrated circuit die 1000 to the lead frame. Consequently, the first ground CGND is usually brought out through the largest pin beneath the integrated circuit die 1000 during this process. However, in PCB systems, optimal heat sink occurs at the voltage input bus VBB pin and the second ground SGND, which are the power and ground planes. Therefore, the conventional method of routing the first ground CGND through the pin directly beneath the integrated circuit die 1000 prevents the integrated circuit die 1000 from being directly connected to these two optimal heat sink pins, limiting its ability to dissipate heat effectively through the PCB. Moreover, adding a dedicated pin for the first ground CGND in packaging significantly increases costs, making it uneconomical to integrate the ground system 100 into the integrated circuit die 1000. In summary, the grounding systems provided in the embodiments of the present application balances heat dissipation and cost-effectiveness in packaging, aiming to improve integrated circuit performance and reduce system costs.

Embodiments of the present application also provide an electronic device comprising the integrated circuit of any one of the embodiments described herein.

Finally, it should be noted that: the above embodiments are only used to illustrate the technical solution of the present application, not to limit it; along the same line of the present application, the technical features in the above embodiments or different embodiments can also be combined, steps can be implemented in any order, and there are many other changes in various aspects of the present application as described above, which are not provided in detail for brevity; although detailed descriptions of the present application have been provided with reference to the aforementioned embodiments, those ordinarily skilled in the art should understand that: modifications can still be made to the technical solutions described in the aforementioned embodiments, or some technical features can be equivalently replaced; and such modifications or replacements do not depart from the scope of the respective technical solutions of the embodiments of the present application.

What is claimed is:

1. A grounding system, comprising:
  a first circuit portion configured to receive an enable signal, wherein,
    a first terminal of the first circuit portion is connected to an input voltage bus, and a second terminal of the first circuit portion is a first ground, and
    the first circuit portion comprises a high-side switch connected between the input voltage bus and a voltage output terminal of the grounding system, and the high-side switch is configured to turn on in response to the enable signal being at a first logic level; and
  a second circuit portion comprising a switch branch and a resistor branch, wherein,
    the resistor branch and the switch branch are both connected between the first ground and a second ground, the resistor branch comprises at least one resistor, and the switch branch comprises a first diode connected between the first ground and the second ground, and
    the switch branch is configured to establish a first current path between the first ground and the second ground and to short the first diode when a positive terminal of a power supply is connected to the input voltage bus and a negative terminal of the power supply is connected to the second ground, and the switch branch is further configured to disconnect the first current path and stop shorting the first diode when the positive terminal of the power supply is connected to the second ground and the negative terminal of the power supply is connected to the input voltage bus.

2. The grounding system according to claim 1, wherein the switch branch is further configured to disconnect the first current path and stop shorting the first diode in response to a negative voltage pulse being applied to the input voltage bus.

3. The grounding system according to claim 1, wherein the switch branch is connected to the input voltage bus, and the switch branch is further configured to:
  establish the first current path and short the first diode in response to a voltage at the positive terminal of the power supply, when the positive terminal of the power supply is connected to the input voltage bus and the negative terminal of the power supply is connected to the second ground; and
  disconnect the first current path and stop shorting the first diode in response to a voltage at the negative terminal of the power supply, when the positive terminal of the power supply is connected to the second ground and the negative terminal of the power supply is connected to the input voltage bus.

4. The grounding system according to claim 3, wherein the switch branch comprises a first switch transistor, and the first diode is a body diode of the first switch transistor; and
  a gate of the first switch transistor is connected to the input voltage bus, a source of the first switch transistor is connected to the first ground, and a drain of the first switch transistor is connected to the second ground.

5. The grounding system according to claim 4, wherein the switch branch further comprises a first resistor and a first Zener diode; and
  the first resistor is connected between the input voltage bus and the gate of the first switch transistor, an anode of the first Zener diode is connected to the source of the first switch transistor, and a cathode of the first Zener diode is connected to the gate of the first switch transistor.

6. The grounding system according to claim 1, wherein the first circuit portion comprises a low-dropout linear regulator connected between the input voltage bus and the switch branch;
  the low-dropout linear regulator is configured to convert a voltage at the positive terminal of the power supply to a first voltage when the positive terminal of the power supply is connected to the input voltage bus and the negative terminal of the power supply is connected to the second ground; and
  the switch branch is further configured to establish the first current path and short the first diode in response to the first voltage.

7. The grounding system according to claim 6, wherein the switch branch comprises a second switch transistor, and the first diode is a body diode of the second switch transistor; and
  a gate of the second switch transistor is connected to an output terminal of the low-dropout linear regulator, an input terminal of the low-dropout linear regulator is connected to the input voltage bus, a source of the second switch transistor is connected to the first ground, and a drain of the second switch transistor is connected to the second ground.

8. The grounding system according to claim 7, wherein the switch branch further comprises a fourth resistor, a fifth resistor, and a third Zener diode;
  the fourth resistor is connected between a gate and a source of the second switch transistor, an anode of the third Zener diode is connected to the gate of the second switch transistor, and a cathode of the third Zener diode is connected to a drain of the second switch transistor; and
  a first terminal of the fifth resistor is configured to receive a voltage output from the low-dropout linear regulator, and a second terminal of the fifth resistor is connected to the gate of the third switch transistor.

9. The grounding system according to claim 1, wherein the switch branch is further configured to establish the first current path and short the first diode in response to the enable signal being at a first logic level, and to disconnect the first current path and stop shorting the first diode in response to the enable signal being at a second logic level, and wherein the first logic level is different from the second logic level.

10. The grounding system according to claim 9, wherein the first circuit portion further comprises a first transistor and a second transistor;
a drain of the first transistor is configured to receive an error current, and the error current is a difference between a current flowing through the high-side switch and a preset reference current; and
the drain of the first transistor is connected to gates of the first transistor and the second transistor, respectively, sources of the first transistor and the second transistor are both connected to the first ground, and a drain of the second transistor is connected to a gate of the high-side switch.

11. The grounding system according to claim 10, wherein the first circuit portion further comprises a fourth switch transistor and a second diode;
a source of the fourth switch transistor and a cathode of the second diode are connected to the drain of the second transistor, a drain of the fourth switch transistor and an anode of the second diode are connected to the gate of the high-side switch; and
the fourth switch transistor is configured to turn on to short the second diode when the enable signal is at a first logic level and is configured to turn off when the enable signal is at a second logic level.

12. The grounding system according to claim 9, wherein the first circuit portion further comprises a second Zener diode, a second resistor, a first current source, and a second current source;
an anode of the second Zener diode, a negative terminal of the second current source and a positive terminal of the first current source are connected to a gate of the high-side switch, a cathode of the second Zener diode is connected to the input voltage bus, the second resistor is connected between the gate of the high-side switch and the voltage output terminal, a negative terminal of the first current source is connected to a bias voltage, and a positive terminal of the second current source is connected to the voltage output terminal.

13. The grounding system according to claim 9, wherein the switch branch further comprises a third switch transistor, and the first diode is a body diode of the third switch transistor;
the third switch transistor is configured to conduct in response to the enable signal being at the first logic level, to establish the first current path and short the first diode; and
the third switch transistor is further configured to turn off in response to the enable signal being at the second logic level, to disconnect the first current path and stop shorting of the first diode.

14. The grounding system according to claim 13, wherein the switch branch further comprises a fourth resistor, a fifth resistor, and a third Zener diode;
the fourth resistor is connected between a gate and a source of the third switch transistor, an anode of the third Zener diode is connected to the gate of the third switch transistor, and a cathode of the third Zener diode is connected to a drain of the third switch transistor; and
a first terminal of the fifth resistor is configured to receive the enable signal, and a second terminal of the fifth resistor is connected to the gate of the third switch transistor.

15. The grounding system according to claim 1, further comprising a third circuit portion connected between the second circuit portion and the second ground, the third circuit portion being configured to generate a voltage drop to reduce a voltage across the first diode; and
wherein the switch branch is further configured to establish a second current path between the second ground and the first ground and to short-circuit the first diode when a negative voltage pulse is applied to the input voltage bus.

16. The grounding system according to claim 15, wherein the third circuit portion comprises a sixth resistor connected between a cathode of the first diode and the second ground.

17. A control method based on a grounding system, wherein the grounding system comprises a first circuit portion connected between an input voltage bus and a first ground, and a second circuit portion connected between the first ground and a second ground, the first circuit portion comprising a high-side switch connected between the input voltage bus and a voltage output terminal of the grounding system, and the control method comprising:
configuring a switch in the second circuit portion to turn on when a positive terminal of a power supply is connected to the input voltage bus and a negative terminal of the power supply is connected to the second ground, to establish a first current path between the first ground and the second ground; and
configuring the switch in the second circuit portion to turn off when the positive terminal of the power supply is connected to the second ground and the negative terminal of the power supply is connected to the input voltage bus, to disconnect the first current path.

18. The control method according to claim 17, further comprising:
configuring the switch in the second circuit portion to turn off when a negative voltage pulse is applied to the input voltage bus.

19. The control method according to claim 17, further comprising:
configuring the switch in the second circuit portion to turn on in response to a negative voltage pulse being applied to the input voltage bus, to establish a second current path between the second ground and the first ground; and
generating a voltage drop through a third circuit portion of the grounding system to reduce a voltage across a body diode of the switch in the second circuit portion, wherein the third circuit portion is connected between the second circuit portion and the second ground.

20. The control method according to claim 17, wherein the first circuit portion further comprises a first transistor, a second transistor, a fourth switch and a second diode, and an input current of a drain of the first transistor comprises an error current, the error current being a difference between a current flowing through the high-side switch and a preset reference current, the drain of the first transistor being connected to a gate of the first transistor and a gate of the second transistor, a source of the first transistor and a source of the second transistor being connected to the first ground, a drain of the second transistor being connected to a source of the fourth switch and a cathode of the second diode, and a drain of the fourth switch being connected to an anode of the second diode and a gate of the high-side switch; and
wherein the method further comprises:

in response to the enable signal being at a first logic level, configuring the high-side switch to conduct and configuring the fourth switch to conduct, to short the second diode; and in response to the enable signal being at a second logic level, configuring the high-side switch to turn off and configuring the fourth switch to turn off.

21. An integrated circuit, comprising:

a first circuit portion configured to receive an enable signal, wherein, a first terminal of the first circuit portion is connected to an input voltage bus, and a second terminal of the first circuit portion is a first ground, and the first circuit portion comprises a high-side switch connected between the input voltage bus and a voltage output terminal, and the high-side switch is configured to turn on in response to the enable signal being at a first logic level; and a second circuit portion comprising a switch branch and a resistor branch, wherein, the switch branch and the resistor branch are both connected between the first ground and the second ground, the resistor branch comprises at least one resistor, and the switch branch comprises a first diode connected between the first ground and the second ground, and the switch branch is configured to establish a first current path between the first ground and the second ground and to short the first diode when a positive terminal of a power supply is connected to the input voltage bus and a negative terminal of the power supply is connected to the second ground, and the switch branch is configured to disconnect the first current path and stop shorting the first diode when the positive terminal of the power supply is connected to the second ground and the negative terminal of the power supply is connected to the input voltage bus.

22. An integrated circuit package comprising a lead frame, adhesive, and the integrated circuit according to claim 21, wherein the adhesive is placed between the lead frame and the integrated circuit to bond the lead frame to the integrated circuit, and the adhesive is configured to be thermally conductive and electrically non-conductive.

23. An electronic device, comprising the integrated circuit according to claim 21.

* * * * *